United States Patent [19]

De Coene et al.

[11] 4,372,723

[45] Feb. 8, 1983

[54] AUTOMATIC BALE WAGONS

[75] Inventors: Frans J. G. C. De Coene; Adrianus Naaktgeboren; Marc G. Vansteelant, all of Zedelgem, Belgium

[73] Assignee: Sperry Corporation, New Holland, Pa.

[21] Appl. No.: 165,153

[22] Filed: Jul. 1, 1980

[30] Foreign Application Priority Data

Jul. 4, 1979 [GB] United Kingdom ............... 7924332

[51] Int. Cl.³ .................... A01D 87/12; B60P 1/36
[52] U.S. Cl. .................... 414/111; 198/603; 414/502; 414/679
[58] Field of Search ............... 414/44, 111, 285, 501, 414/502, 679; 198/603

[56] References Cited

U.S. PATENT DOCUMENTS 3,904,056  9/1975  Bertling et al. .................... 414/111

FOREIGN PATENT DOCUMENTS 2352208  4/1975  Fed. Rep. of Germany ...... 414/111
2331274  6/1977  France .
1453218  10/1976  United Kingdom .............. 414/111
1465357  2/1977  United Kingdom .

Primary Examiner—Leslie J. Paperner
Attorney, Agent, or Firm—Larry W. Miller; Frank A. Seemar

[57] ABSTRACT

An automatic bale wagon comprising a frame, at least one load floor mounted on the frame, bale pick-up means operable to pick up bales from the ground for delivery to the load floor, or one of the load floors, conveyor means operable to convey bales on the or each load floor in a predetermined manner and such that the direction of movement of the bales is changed at one or more points in the path of travel, and bale support means movable in synchronism with the conveyor means to support one or more bales at a point at which a change in the direction of movement of the bale or bales is effected.

17 Claims, 29 Drawing Figures

AUTOMATIC BALE WAGONS

BACKGROUND OF THE INVENTION

This invention relates to automatic bale wagons, that is bale wagons which pick up bales from the ground, load the bales onto one or more load beds or floors in a predetermined manner, and unload the bales, also in a predetermined manner, without any manual assistance save for an operator to drive the wagon (be it of the self-propelled or towed type) and operate the controls.

In contrast to the automatic bale wagon, there exists the random bale wagon which has the advantage of simplicity, since all that is required is a load space and a mechanism to pick-up bales from the ground and throw them into the load space, but suffers from the disadvantage that maximum use is not made of the load space due to the random loading of the bales therein unless there is manual intervention which is time-consuming. Thus the automatic bale wagon was developed to maximise the use of the available load space and to minimise the time required for bale loading and unloading.

Different types of automatic bale wagons have been proposed and a particularly successful type has been the one employing a load table onto which are transferred bales from a transfer table receiving bales from bale pick-up means, the load table being generally horizontal during the loading operation. When the load table is full of bales, it is pivoted to a generally vertical position so that the bales thereon form a tier of bales which is then moved onto a load bed or floor of the bale wagon. As tiers of bales are successively placed on the load bed, a stack of bales is formed which is compact and, therefore, maximum use is made of the available load space. A bale-unloading mechanism is provided which unloads bales either singly or otherwise.

Another type of automatic bale wagon employs a plurality of load floors disposed one above the other and various mechanisms for loading the floors with bales either in turn or simultaneously. In German Patent Specification No. 2,352,208 there is disclosed a bale wagon of this type in which each load floor, except the lowermost, is provided with a conveyor which also serves to transfer bales from one floor to another in conjunction with passive guide means. The use of a conveyor on all but one load floor increases the cost of production and maintenance of the bale wagon and the passive guide means are unsatisfactory in that if they are dimensioned so as to exercise close guidance of the bales, as is desired, then there is inevitably considerable sliding contact between the bales and guide means which gives rise to friction resulting in hesitant bale movement. If sliding contact between the bales and guide means is minimised, there is some loss in bale control with the attendant risk of bale jamming.

Another example of this type of bale wagon is to be found in British Patent Specification No. 1,453,218 which discloses one arrangement having a conveyor associated with each load floor and employing a bale elevator at each end of the wagon in the form of an endless conveyor operable to transfer bales from one floor to another. The use of active conveyors avoids the aforementioned problems associated with passive guide means but increases the number of complicated, and hence expensive, components. Furthermore, the elevators do not exercise positive control over the bales so that hesitant bale movement can arise which is undesirable. In another arrangement disclosed in British Patent Specification No. 1,453,218, only alternate load floors are provided with conveyors, which is a useful saving, but the bale elevators are replaced by rotary, transversely-extending bale conveyors which act in association with passive guide means to transfer bales from one load floor to another. These extra conveyors negate the saving in the floor conveyors and the problems arising from the use of passive guide means are present.

SUMMARY OF THE INVENTION

It is an object of the present invention to simplify the construction of automatic bale wagons and yet to exercise positive control over bales being handled which have to undergo a change in direction whether on a given load floor or in moving from one load to another.

In its broadest concept, the present invention provides an automatic bale wagon comprising a frame, at least one load floor mounted on the frame, bale pick-up means operable to pick up bales from the ground for delivery to the load floor, or one of the load floors, conveyor means operable to convey bales on the or each load floor in a predetermined manner and such that the direction of movement of the bales is changed at one or more points in the path of travel, and bale support means movable in synchronism with the conveyor means to support one or more bales at a point at which a change in the direction of movement of the bale or bales is effected.

The present invention also provides an automatic bale wagon comprising a frame, a plurality of load floors disposed one above another and mounted on the frame, bale pick-up means operable to pick up bales from the ground for delivery to the lowermost load floor, conveyor means operable to convey bales successively on each load floor in a predetermined manner, with the bale movement associated with one load floor being opposite to that associated with the adjacent load floor or floors, and bale support means movable in synchronism with the conveyor means to support one or more bales being transferred by the conveyor means from one load floor to the next load floor above.

Preferably the bale support means comprise two spaced pivotal arms interconnected by an angled member engageable by a corner of the bale or bales to be supported. The arms of the bale support means may be rigidly connected to a shaft on which a driven member of the conveyor means is freely rotatably mounted, and clutch means may be provided between said driven member and the shaft, the clutch means being engageable over a portion of each revolution of the driven member so as to drive the bale support means over a predetermined arc once per revolution of the driven member.

In one embodiment the driven member is a sprocket and the clutch means comprises an extension carried by the sprocket and a member pivotally mounted on the shaft and having a hooked end and an angled heel portion at the other end, the extension being engageable with the hooked end of the member at a predetermined point in the rotational cycle of the sprocket so as to clutch the sprocket to the shaft, and hence drive the latter and the bale support means, the extension being disengageable from the hooked end of the member at a further predetermined point in the rotational cycle of the sprocket by the engagement of the heel portion of the member with a trip member mounted on the frame so as to pivot the member out of engagement with the extension, whereby drive to the bale support means is interrupted and the bale support means return to the rest position.

Damper means may be provided to damp both the driven and non-driven movement of the bale support means, the damper means conveniently being of the piston and cylinder type with the arrangement being such that the direction of relative movement of the piston and cylinder is reversed at the point at which the shaft is de-clutched from the sprocket.

The provision of active bale support means, in accordance with the invention, overcomes the problems associated with passive guide means discussed hereinbefore in a particularly simple but effective manner. Since the bale support means move in synchronism with the conveyor means, there is no rubbing or sliding contact between the bales and the bale support means and yet the bales undergo a change in direction of movement in a fluent manner.

The conveyor means preferably comprise at least one chain conveyor having attached thereto at equi-spaced intervals along its length a plurality of bale pushers each of which, in use, is engageable with one or more bales to effect movement thereof. When a plurality of load floors are provided in the bale wagon, even numbered load floors are each provided with a chain conveyor such that each pusher is operable to move the or each bale it in use engages first along the length of the odd numbered load floor immediately below the even numbered load floor on which the conveyor is provided, then to transfer the bale or bales, in conjunction with the bale support means, from the odd numbered load floor to the even numbered load floor, and finally to move the bale or bales along the length of the even numbered load floor.

Each bale pusher may be attached to the associated chain via a bracket to which the pusher is rigidly attached, the bracket in turn being rigidly attached to the chain and having an extension disposed generally parallel to, and engageable with, the associated chain, whereby to limit movement of the pusher due to chain flexure. Preferably each pusher is attached to the chain such that, in the rest position, it is inclined to the vertical in the direction of its movement such as by an angle of 10°, for example.

In a preferred embodiment each pusher is engageable with two bales and is operable to move the same simultaneously, the pusher engaging each of the two bales along approximately two thirds of its length.

The provision of bale pushers in conjunction with the bale support means gives rise to very effective bale movement and control and ensures substantially constant spacing between the bales longitudinally of the conveyor means.

Elevator means may be provided to transfer bales from one end of an even numbered load floor to the corresponding end of an odd numbered load floor immediately thereabove, except the uppermost load floor, the elevator means being rendered operative by bale-presence sensing means actuatable upon one or more bales being moved into the elevator means. Preferably each odd numbered load floor to which the elevator means in use transfers bales has a floor portion above the elevator means in the form of a pair of pivotal trap doors normally in the closed position, the trap doors being pivotable to the open position by a bale or bales being elevated by the elevator means and the trap doors automatically returning to the closed position when the elevated bale or bales is or are clear thereof so that the floor portion formed by the trap doors can support the elevated bale or bales on return of the elevator means to the load floor below.

The two trapdoors of each of said load floor portions may be spaced apart by a distance sufficient to allow a bale-supporting platform of the elevator means to pass therethrough when the doors are in the closed position. Conveniently each trap door is of generally V-shaped cross section with one limb of the V disposed generally horizontal in the closed position and the other limb defining an acute angle with said one limb and extending downwardly to provide a lead-in surface for the bale or bales being elevated, and the apices of the two doors of a pair facing each other and extending transversely of the associated load floor. The said one limb of the trap door adjacent the end of the associated load floor may be extended so as to overlap that end of the load floor to provide a smooth transition for bales being moved from the trap door floor portion to the main load floor associated therewith.

The conveyor means may be chain conveyors driven intermittently by a predetermined amount according to the size of bale being handled, whereby the spaces between pushers, when provided, are filled in turn so that maximum loading of the bale wagon is assured from this standpoint. Drive means for each chain conveyor may comprise a prime mover movable linearly, a drive member pivotally attached to the prime mover and having a drive portion releasably engageable with the chain and normally being disengaged therefrom, and a drive-engaging member pivotally attached to the drive member and engageable on one side of its pivot point with the drive member and on the other side of the pivot point with the chain through one of a plurality of equi-spaced extensions mounted on the chain, movement of the prime mover moving both the drive member and the drive-engaging member in the desired direction of movement of the chain whereupon the drive-engaging member contacts the next chain extension and is pivoted thereby which results in pivotal movement of the drive member such that the drive portion thereof engages the chain and imparts drive to the latter.

If four or more load floors are provided involving two or more chain conveyors, the prime movers of the drive means for the latter may be an arrangement of master and slave hydraulic cylinders.

BRIEF DESCRIPTION OF THE DRAWINGS

An automatic bale wagon embodying the present invention will now be described in greater detail, by way of example, with reference to the accompanying drawings, in which.

DESCRIPTION OF THE PREFERRED EMBODIMENT

Figure 1:
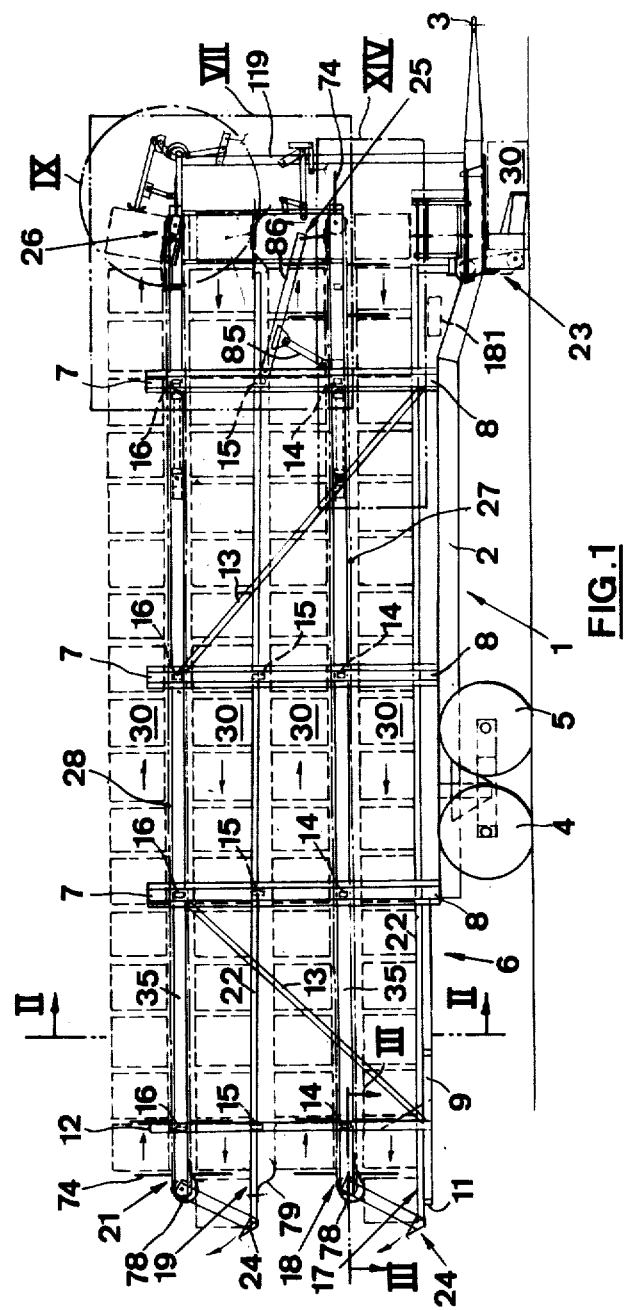
FIG. 1 is a diagrammatic side elevation of the bale wagon with certain components removed for clarity.
Figure 2:
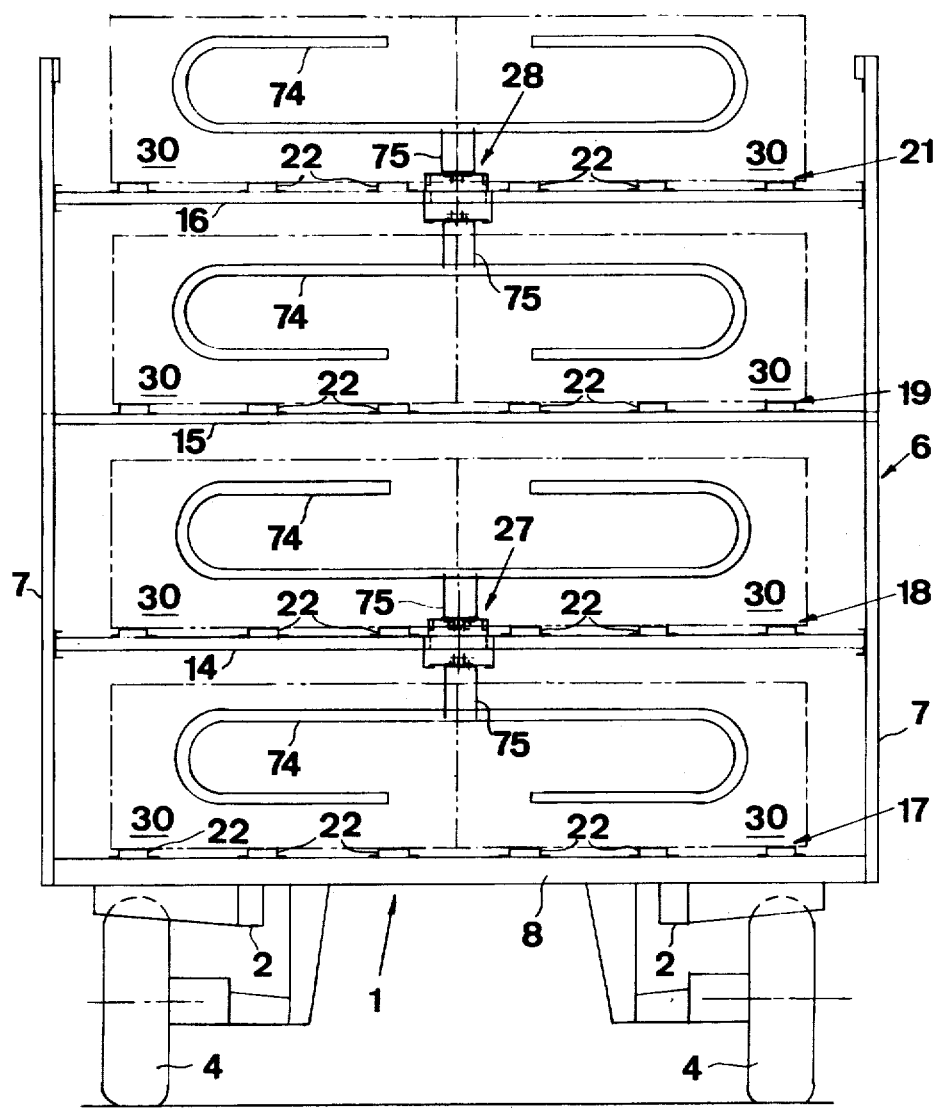
FIG. 2 is a section on line II—II of FIG. 1.

With reference to the drawings, particularly FIGS. 1 and 2, the bale wagon is of the pull type and comprises a chassis 1 formed from two longitudinally-extending members 2 which converge at the front of the wagon to form a conventional hitch 3. Attached beneath the chassis 1 is a wheel assembly comprising two pairs of ground-engaging wheels 4 and 5. Carried on top of, and attached to, the chassis 1 is main frame 6 for the wagon comprising three pairs of main upright beams 7 interconnected by three transverse beams 8. The frame is extended rearwardly by two longitudinally-extending side member 9 attached at one end to the rearwardmost transverse beam 8 and interconnected at the other end by a further transverse beam 11. A further pair of upright beams 12 is provided, together with stabilising cross struts 13 interconnecting the beam 12 with the associated rearwardmost beam 7, additional cross struts being provided between the front two pairs of upright beams 7.

Each pair of upright beams 7 and 12 is interconnected at spaced intervals above the chassis by three transoms 14, 15, 16, each set of transoms forming the basis of a load floor with another load floor being formed by the transverse beams 8. Thus, first, second, third and fourth load floors 17, 18, 19 and 21, respectively, are provided in the bale wagon, each floor having a base comprising a plurality of slats 22 spaced apart transversely of the wagon. The slats are made from sheet metal and have an inverted U shape with side flanges by which they are bolted or otherwise secured to the transverse beams 8 and 11 or transoms 14, 15 and 16, as appropriate.

The bale wagon further generally comprises bale pick-up means 23 mounted on the chassis 1 at the front, and to one side, of the wagon, bale support means 24 provided at the rear ends of the second and fourth load floors 18 and 21, bale elevator means 25 provided at the front end of the second load floor 18 and operable between the second and third load floors 18 and 19, and bale unloading means 26 disposed at the front end of the fourth load floor 21. The general operation of the bale wagon is such that bales 30 are picked up from the ground by the pick-up means 23 and moved step by step in end-to-end pairs first rearwardly of the wagon along the length of the first load floor 17, then transferred from the first load floor to the second load floor 18 with the aid of the associated bale support means 24 and conveyed the length thereof forwardly of the bale wagon to the elevator means 25, raised by the latter to the third load floor 19, conveyed rearwardly of the wagon along the length of the third load floor 19, transferred to the fourth load floor 21 with the aid of the associated bale support means 24, and finally conveyed forwardly of the wagon along the length of the fourth load floor 21 to the unloading means 26. It will be seen that the bales move in alternate directions in traversing the four load floors 17, 18, 19 and 21.

The bales are moved in the bale wagon by intermittently driven conveyor means in the form of chain conveyors 27 and 28 respectively provided on the second and fourth load floors 18 and 21 only and disposed centrally thereof. The chain 29 of each conveyor 27 and 28 is supported at the front and rear of the wagon by idler sprockets 31 and 32, respectively, although the front sprocket 31 may be a non-toothed idler. Each sprocket 31 and 32 is adjustable longitudinally of the wagon to obtain the correct chain tension, the front sprocket 31 being attached to a stub shaft 36 mounted in a pair of spaced bearings 38 attached to respective brackets 39 which are slidable in slides 41 extending forwardly from the forwardmost transom 14 or 16. The brackets are releasably secured in a selected position within the slides, none of the components other than the sprocket 31 are shown in detail but they are similar to those now to be described in relation to the rear sprockets 32.

Figure 3:
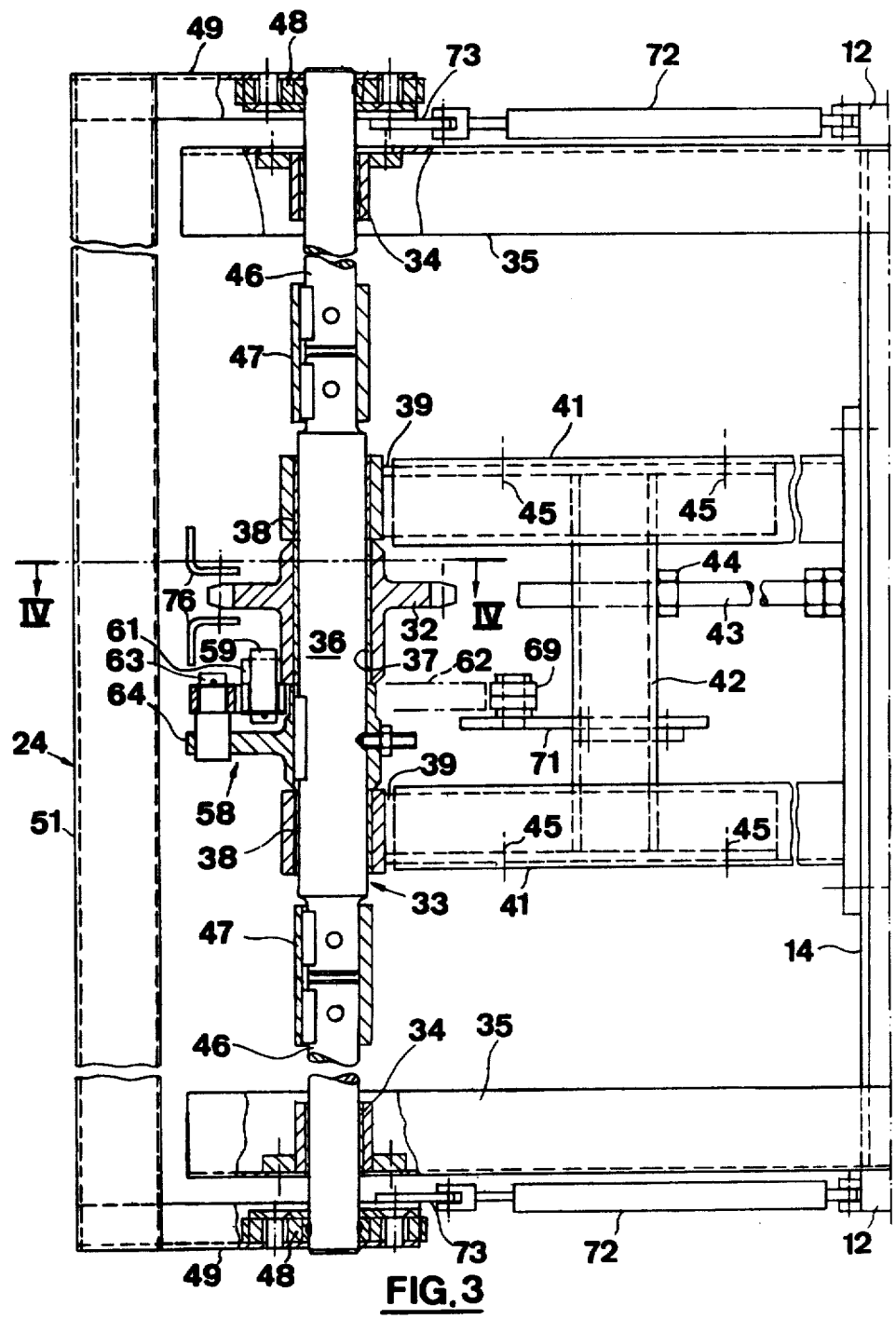
FIG. 3 is a section on line III—III of FIG. 1.

As seen in FIG. 3 the rear sprocket 32 is normally freely rotatably mounted on a composite shaft 33 mounted in bushes 34 housed in respective U-shaped side members 35 extending the length of the second and fourth load floors 18 and 21. The composite shaft 33 comprises a central portion 36 on which the sprocket 32 is normally rotatable via a bush 37. The central shaft portion 36 is supported for rotation in two spaced bearings 38 attached to brackets 39 slidably mounted in U-shaped slides 41 extending from the rearwardmost transom 14 (as seen in FIG. 3 but from the transom 16 in the case of the fourth load floor 21). The brackets 39 are interconnected by a cross member 42 through which passes a threaded spindle 43 attached at one end to the transom 14, the position of the sprocket 32, and hence chain tension, being adjustable by rotation of a nut 44 on the spindle 43 and the sprocket being releasably secured in a selected position by a pair of nuts and bolts passing through elongated slots (not shown) in the slides 41 and through the brackets 39 at the locations indicated at 45 in FIG. 3.

The remainder of the composite shaft 33 is made up of two end shaft portions 46 of reduced diameter, compared with the central shaft portion 36, and releasably connected to the central portion by sleeves 47 to which the associated ends of the shaft portions are keyed. With this arrangement the sprocket 32 is readily removed for replacement, when necessary, merely by sliding the sleeves 47 of the central shaft portion 36 and withdrawing the latter, together with the brackets 39 once the bolts attaching the latter to the slides 41 have been removed. This arrangement also allows a saving in component cost because only the central shaft portion 36 need be of increased diameter to take the load imposed thereon in use of the wagon instead of the whole of the shaft 33 which otherwise would be the case. The end shaft portions 46 extend through the side members 35 and are attached through shock-absorbing couplings 48 to respective arms 49 forming part of the bale support means 24 provided at the rear end of each of the second and fourth load floor 18 and 21. The bale support means 24 further comprise a transverse angled member 51 connected between the arms 49 and is seen most clearly in FIG. 4. The angled member 51 is formed from sheet metal and has two limbs 52 and 53 inclined at an obtuse angle of 115° relative to each other, with the limb 52 inclined at an angle of 42° to the vertical when the bale support means 24 are in the rest position as seen in full lines in FIG. 4. Each limb 52 and 53 has a flanged edge 54 and 55, respectively, with the flange 55 being engageable with bumpers 56 attached to the ends of the respective load floors 17 and 19. The arms 49 are attached to the end plates 57 of the angled member 51.

It is seen that the bale support means 24 on the second and fourth load floors 18 and 21 will rotate with the shaft 33 on movement of the latter and such movement is imparted by a clutch 58 provided between the sprocket 32 and the shaft 33. The clutch 58 is arranged to operate over only a portion of each revolution of the sprocket 32 which is driven by drive means (to be described) which drive the associated chain 29. Thus the bale support means 24 are swung from the rest (full line) position of FIG. 4 to the broken line position of FIG. 4 once per revolution of the associated sprocket 32. When the shaft 33 is de-clutched from the sprocket 32, the bale support means 24 return under gravity to the rest position, this movement being damped (as will be described) and the angled member 51 being protected by the bumpers 56. The specific relationship and orientation of the limbs 52 and 53 of the angled member 51 is such that bales being supported thereby during transfer from one load floor to another are not fouled by the member 51 when the latter returns to the rest position. It will be noted that the limb 53 of the angled bale support member 51 lies below the level of the associated load floor and this is to ensure that bales moving onto the member 51 do not pivot the latter which is freely rotatable with the shaft 33. As the bale support means 24 pivot when the shaft 33 is clutched to the sprocket 32, the corners of the bales 30 engage the "corner" of the limbs 52 and 53 and thereafter positive support of the bales is effected.

Figure 4:
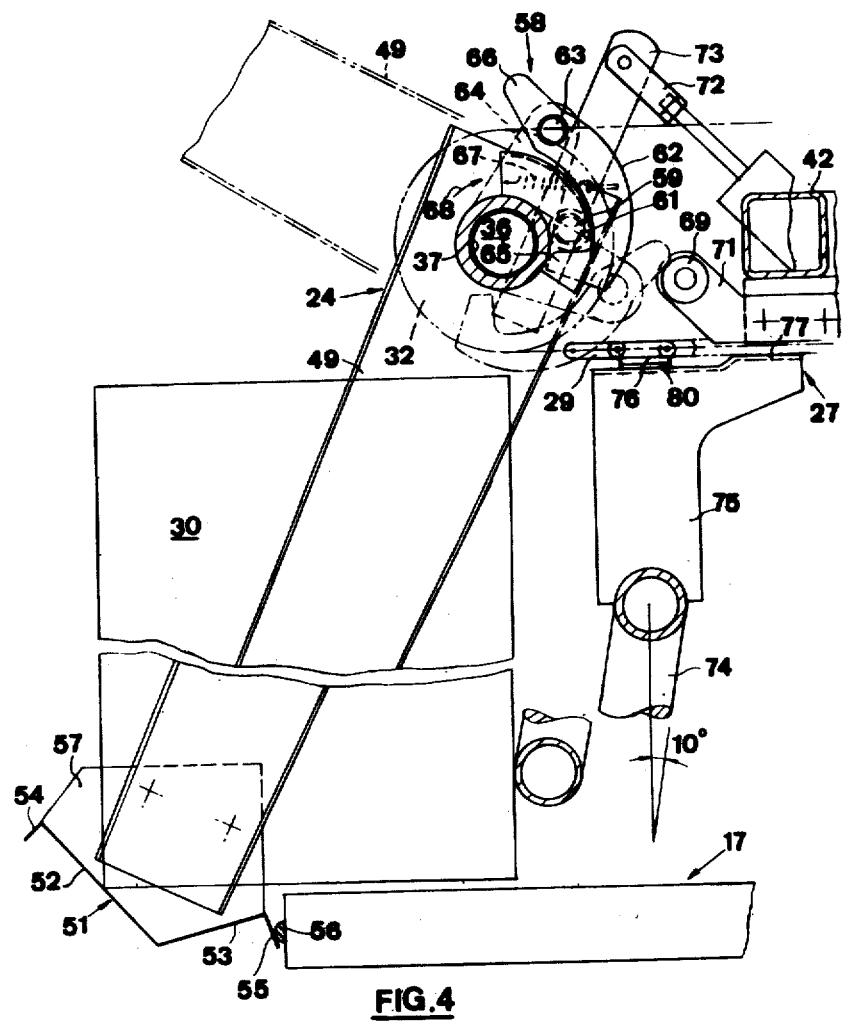
FIG. 4 is a section on line IV—IV of FIG. 3, FIGS. 5 and 6 are respective enlarged views of two components of FIG. 1.

Referring to FIGS. 3 and 4, the clutch 58 comprises an extension, in the form of a stub shaft 59, carried by the associated sprocket 32 and having a roller 61, and a member 62 pivotally attached at 63 to a bracket 64 keyed to the central shaft portion 36. The member 62 has a hooked end 65 and an angled heel portion 66 at the other end but otherwise being arcuate in shape as seen in side view (FIG. 4). The hooked end 65 is urged towards the central shaft portion by a spring 67 interconnecting the two components. When the associated chain 29 is driven, the sprocket 32 rotates in the direction 68 (FIG. 4) and freely rotates on the shaft 33 until such time as the roller 61 engages the hooked end 65 of the member 62 whereupon the shaft 33 is clutched to the sprocket 32 and is rotatably driven. Thus the bale support means 24 pivots upwardly, this movement continuing until the heel 66 of the member 62 engages a trip member, in the form of a roller 69 mounted on the end of an arm 71 attached to the cross member 42, which pivots the member 62 about the pivot 63 away from the shaft 33 against the action of the spring 67 so as to disengage the hooked end 65 from the roller 61 and thus de-clutch the shaft 33 from the sprocket 32. This event occurs when the member 62 is in the broken line position of FIG. 4 and when the hooked end 65 is clear of the roller 61, the spring 67 returns the member 62 to its normal position in relation to the shaft 33 and the fall of the bale support means from the broken line position to the full line position of FIG. 4 on the de-clutching of the shaft 33 returns the member 62 to the full line position. It will be noted that the bale support means is pivoted through an arc of approximately 95° per revolution of the associated sprocket 32 and that the arms 49 are moved synchronously by virtue of being attached to the shaft 33.

The fall of the bale support means 24, on the de-clutching of the shaft 33, is damped by pneumatic piston and cylinder assemblies 72 disposed one on each side of the bale support means 24 and each pivotally attached at one end to the adjacent upright beam 12 (not seen in FIG. 4) and pivotally attached to the other end to an extension 73 of the associated bale support arm 49. In the rest (full line) position of the bale support means 24 as seen in FIG. 4, the extension 73 and the corresponding piston and cylinder assembly 72 are relatively inclined at an angle such that the assembly is contracted as the bale support means pivot upwardly when the shaft 33 is clutched to the sprocket 32 until the moment of de-clutching when the axes of the extension 73 and piston and cylinder assembly are aligned. Thus any further pivotal movement of the bale support means 24 due to inertia is damped by extension of the piston and cylinder assembly as the latter effectively goes "over centre". When the bale support means return to the rest position, the piston and cylinder first contract until they go back "over centre" and then extend.

Upon bales being transferred between the first and second load floors 17 and 18 and between the third and fourth load floors 19 and 21 the bale support means serve principally to support the bales rather than impart a lifting force thereto which is effected in the main by bale pushers 74 attached at equi-spaced intervals to the chains 29, the size of the intervals being determined by the size of bale being handled. More specifically, each pusher 74 is attached to the associated chain 29 by a bracket 75 to which it is secured, the bracket being L-shaped as seen in side view and being bolted towards the junction of the limbs to two plates 76 attached to the selected link of the chain 29 via an intermediate plate 80 adapted to rest on and slide along wooden guides 70 during operation. Thus one limb 77 of the bracket 75 extends along, and bears against the chain 29 and thus serves to restrict, to some extent, movement of the pusher 74 due to chain flexure. However, some displacement of each pusher 74 will occur due to chain flexure and to accommodate this, the plane of each pusher is inclined to the vertical in the direction of chain movement at an angle of 10° so that, in use, the pusher lies flat against the bales. FIG. 4 shows a pusher 74 in its nominal position relative to the bales 30. Each pusher 74 is formed from the metal tubing to provide the necessary structural strength and the minimum weight and is C-shaped with the bracket 75 attached centrally of the main limb thereof. It should be noted that each pusher 74 engages two bales 30 positioned end-to-end across the wagon, the pusher engaging each of the two bales over approximately two thirds of its length as seen in FIG. 2.

Figures 5, 6:
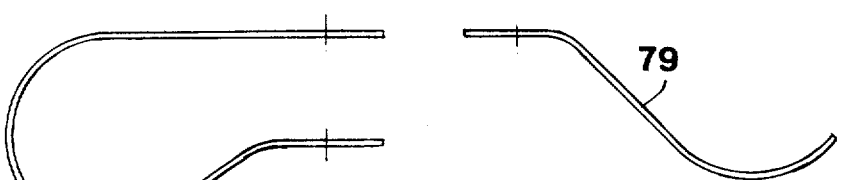

In order to help retain and guide the bales being transferred from one load floor to another with the assistance of the bale support means, loops 78 (FIGS. 1 and 5) of spring steel are provided around the rear ends of the second and fourth load floors 18 and 21 at spaced intervals thereacross. Spring steel fingers 79 (FIGS. 1 and 6) are provided on the underside of the third load floor 19 to damp the movement of bales being transferred to the second load floor 18. It will be seen from FIG. 1 that the first and third load floors 17 and 19 extend further rearwardly of the wagon than the second and fourth load floors 18 and 21 so that the latter do not hinder the transfer of bales from the load floor beneath, which bales undergo a 180° movement on transfer.

It will be appreciated that each chain conveyor 27 and 28 serves two load floors which is very economical and the pushers 74 serve both to convey the bales along the appropriate load floors and transfer the bales from one floor to another in conjunction with the bale support means as far as the first and second load floors 17 and 18 and the third and fourth load floors 19 and 21 are concerned. However other means have to be provided to transfer bales between the second and third load floors 18 and 19 since the third load floor has no chain conveyor associated therewith. The means employed are the elevator means 25 located at the forward end of the second load floor 18 and which will now be described with particular reference to FIGS. 7 and 8.

The elevator means 25 comprises two separate rectangular end frames 81 fitted with a pair of rollers 82 on each of two opposed, generally vertically disposed sides, the rollers engaging respective upright guide channels 83 connected to the associated frame side members 35 and thereby serving also as auxiliary uprights for the frame 6. Each end frame 81 has attached thereto a generally horizontal floor section, the two sections together forming a floor for the elevator means with the contiguous ends of the sections spaced apart to allow the through passage of the chain conveyor 27 and brackets 75 of the bale pushers 74 associated with the second load floor 18. Upward movement of the elevator means is effected by two single-acting hydraulic cylinders 85 connected at one end to the respective elevator end frames 81 by a linkage system and pivotally connected at the other end to the forwardmost upright beams 7.

Figure 7:
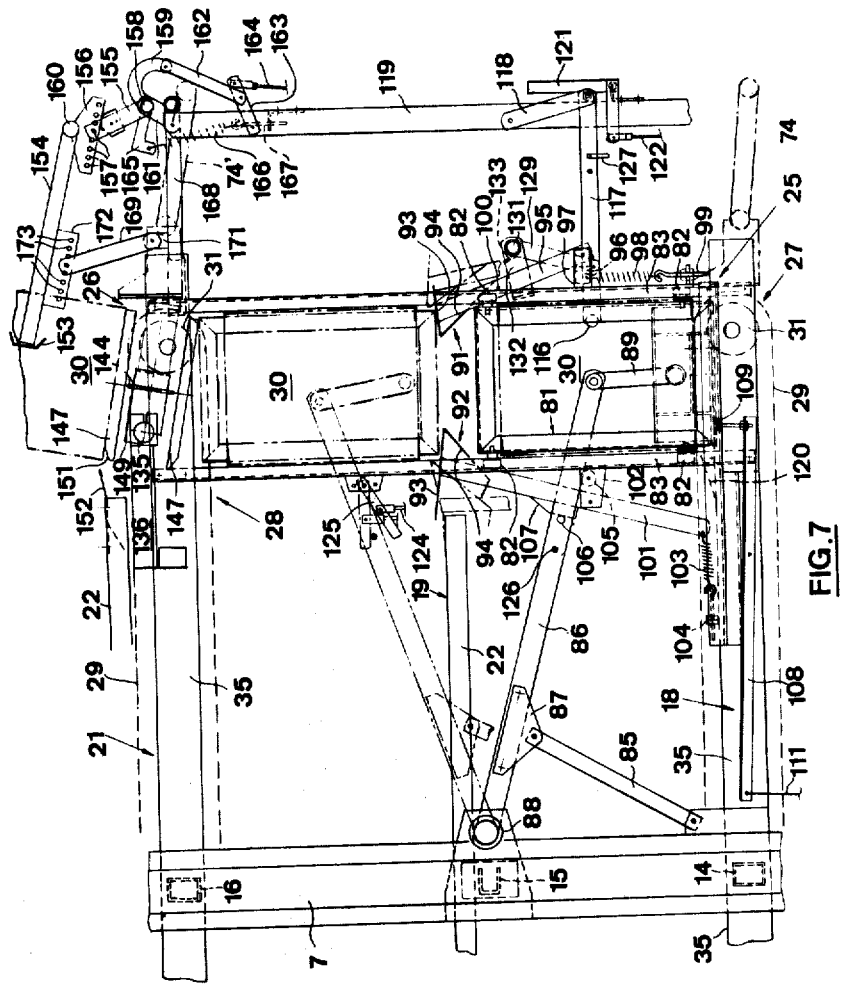
FIG. 7 is an enlarged view of the portion of FIG. 1 indicated at VII.
Figure 8:
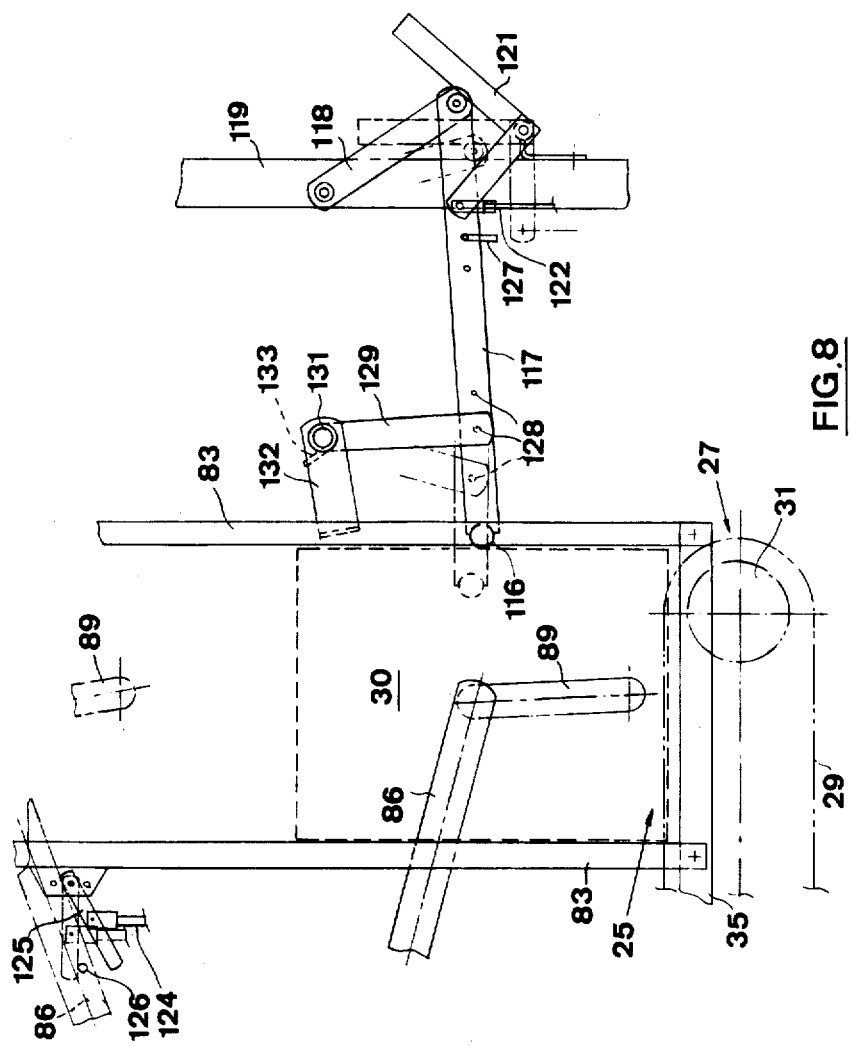
FIG. 8 is an enlarged view of a portion of FIG. 7.

Each linkage system comprises an arm 86 to which the associated hydraulic cylinder 85 is pivotally attached intermediate its ends via a bracket 87, the arm 86 being attached at one end to a shaft 88 and pivotally attached at the other end to a link 89 which is in turn pivotally attached to the centre of the bottom member of the associated end frame 81. On actuation of the cylinders 85, the arms 86 are pivoted anticlockwise, as seen in FIG. 7, and the elevator 25 raised to the broken line position of FIG. 7. The shaft 88 to which both arms 86 are attached ensures synchronous movement of both halves of the elevator 25. Clearly, the forward end of the main portion of the third load floor 19 has to terminate short of the front end of the wagon to permit movement of the elevator means 25. Equally clearly, some flooring has to be provided above the elevator 25 as an extension of the third load floor 19 in order to receive bales elevated from the second load floor 18 and this is achieved by a pair of pivotal trap doors 91 and 92.

The trap doors 91 and 92 are formed from sheet metal and have a generally V-shaped cross section with the limbs 93 disposed generally horizontally, although slightly downwardly inclined, and the limbs 94 extending downwardly. The apices of V-shaped trap doors 91 and 92 face each other and extend transversely of the bale wagon. The limb 93 of the trap door door 92 is extended so as to overlap the end of the third load floor 19 at all times to provide a smooth transition between the floor portion formed by the trap door 92 and the main floor. The trap door 91 is connected at each end to an arm 95 which forms a bell crank lever with a further arm 96, the lever being pivotally attached to a bracket 97 connected to the forwardmost guide channel 83. The outer end of the arm 96 is connected to one end of a spring 98 the other end of which is also attached to the forwardmost guide channel 83 via a spring tension adjustment mechanism 99. Stops 100 on the arms 95 are engageable with the forwardmost guide channel 83 to limit closure movement of the trapdoor 91. The trapdoor 92 is connected at each end to one end of an arm 101 pivotally attached intermediate its ends to the rearwardmost guide channel 83 via a bracket 102 and connected at its other end to the associated side member 35 via a spring 103 and spring tension adjustment mechanism 104.

On actuation of the hydraulic cylinders 85, the elevator 25 is moved from the full line position to the broken line position of FIG. 7 and the pair of bales carried thereby force open the trap door 91 and 92 against the action of the springs 98 and 103, the trap door limbs 94 providing lead-in surfaces for the elevated bales. As soon as the bales and elevator floor are clear of the trap doors 91 and 92, the latter automatically close under the action of the springs 98 and 103 so that they support and retain the elevated bales as the elevator returns to the rest position aligned with the second load floor 18 on de-actuation of the hydraulic cylinders 85. Bumpers 105 are carried by the brackets 102 to cushion the fall of the elevator, the bumpers being engageable by the arms 86. When a pair of bales is elevated by the elevator 25, a bale pusher 74' (FIG. 7) on the chain conveyor 28 is in a horizontal position extending from the fourth load floor 21 and ready to engage and convey the bales just elevated when next drive is imparted to the conveyor. The pusher 74' slides the elevated bales off the floor portion formed by the trapdoors 91 and 92 and in order to ensure that this movement does not effect an opening of the door 92, the latter is locked when the elevator is in the rest position by stops 106 carried by the arms 86 and engageable by respective brackets 107 on the arms 101. As the arms 86 are raised by the hydraulic cylinders 85, the stops 106 disengage the brackets 107, whereupon the trapdoor 92 is free to pivot open.

It is also important to ensure that no attempt is made to load bales into the elevator 25 when the latter is other than in the rest position. This is achieved by a mechanism comprising a lever 108 pivotally connected intermediate its ends to the adjacent side member 35 and carrying at one end a button 109. The other end of the lever 108 is connected to a rod 111 attached to an elevator safety valve 112 (FIG. 26) forming part of the hydraulic system of the bale wagon to be described. When the elevator 25 is in the rest position, the button 109 is engaged thereby and the lever is in the position shown in FIG. 7 with the safety valve 112 in the position shown in FIG. 26 which permits master and slave cylinders 113 and 114, respectively, to be energised and extended to drive the conveyors 27 and 28 in a manner to be described. When the elevator 25 is raised, the button 109 is disengaged thereby and a spring in the safety valve 112 pulls on the rod 111 and changes the valve to the position in which the master and slave cylinders 113 and 114 cannot be energised to extend and thus to drive the conveyors 27 and 28. As the elevator 25 returns to the rest position, the button 109 is re-engaged and the lever pivoted back to the position of FIG. 7 which changes the valve 111 back to the position in which the master and slave cylinders 113 and 114 can be energised.

Figure 26:
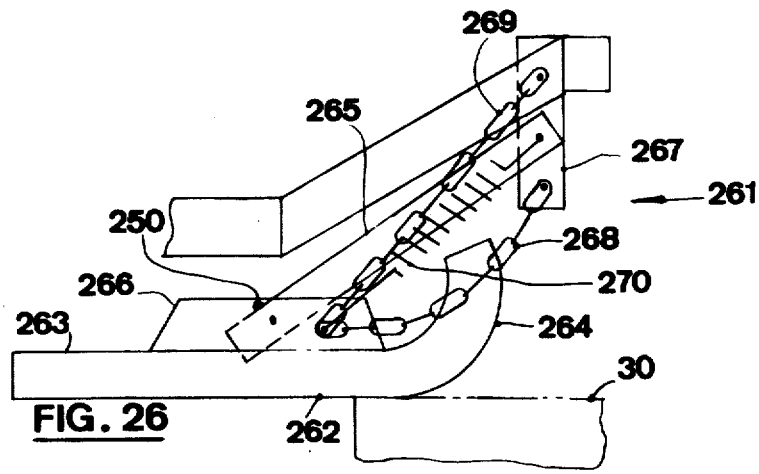
FIGS. 26, 27 and 28 are enlargements of the areas of FIGS. 23, 24 and 25 indicated at XXIII, XXIV and XXV, respectively.
Figure 27:
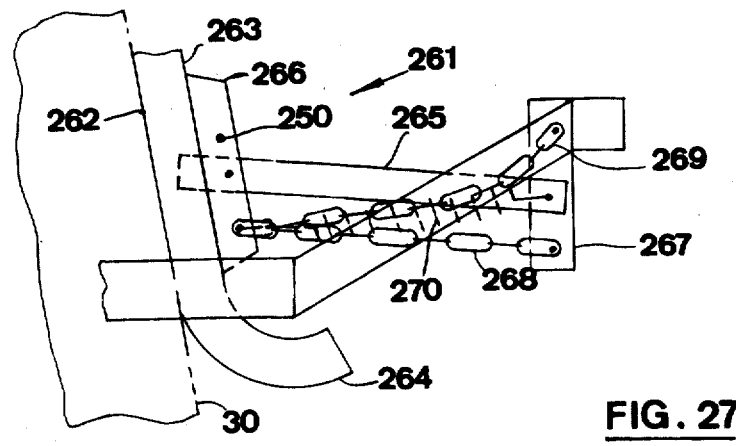
Figure 28:
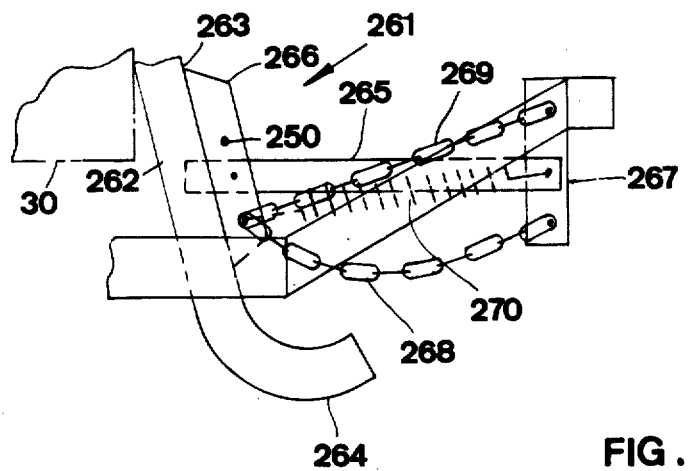

The actuation of the hydraulic cylinders 85 to raise the elevator 25 is commanded by a bale-presence sensing mechanism comprising a sensor 116 in the form of a transversely-extending tube extending into the path of bales delivered to the elevator by the second load floor conveyor 27 at a point where the bales are almost located fully within the elevator. The sensor 116 is dimensioned and positioned to allow the bale pushers 74 to pass thereover in moving from the second load floor 18 back to the first load floor 17. A U-shaped arm 117 is attached centrally of the sensor 116 at one end and pivotally attached at the other end to one end of a link 118 which in turn is pivotally attached at its distal end to a further upright and central beam 119 of the bale wagon frame 6. The arm 117 engages one limb of a bell-crank lever 121 pivotally mounted on the beam 119 and having its other limb pivotally attached to the end of a push-pull cable 122 connected to an elevator control valve 123 (FIG. 26). Another push-pull cable 124 is also connected at one end to the valve 123 and at the other end to a lever 125 pivotally mounted on the rearwardmost guide channel 83 and engageable by a pin 126 carried by one of the arms 86. The arm 117 is fitted with an adjustable stop 127 engageable with the beam 119 to limit movement of the arm by bales engaging the sensor 116. Intermediate the ends of the arm 117 there is pivotally attached at a selected one of a number of alternative positions 128 one end of a link 129 the other end of which is attached to a stub shaft 131 carried by a pair of brackets 132 attached to the forwardmost guide channel 83. A coil spring 133 is attached between the shaft 131 and one of the brackets 132.

As a pair of bales is moved into the elevator 25 from the second load floor 18 over a flexible, slightly upwardly inclined transition floor member (not shown) which terminates short of the elevator so as not to foul the latter, the sensor 116 is actuated as the bales approach their final position in the elevator, whereupon the arm 117 is moved to the right as seen in FIG. 7. This movement pivots the link 129 anticlockwise and tightens the coil spring 133, and also pivots the bell crank lever 121 clockwise to raise the limb to which the push-pull cable 122 is attached and hence pull the latter. Movement of the cable 122 changes the elevator control valve 123 from the inoperative to the operative position in which the hydraulic cylinders 85 are energised and hence the elevator 25 raised with the consequential opening of the trap doors 91 and 92 as already described. The change-over of the control valve 123 pulls the cable 124 and hence pivots the lever 125 anticlockwise to the broken line position shown in FIG. 7. As the elevator 25 moves upwardly and approaches the desired maximum height (at which the elevated bales are clear of the trap doors 91 and 92 allowing the latter to close) the pin 126 on the arm 86 engages the lever 125 and pivots clockwise back to the rest position thus pulling on the cable 124 to change the control valve 123 back to its original position to de-energise the cylinders 85. The elevator 25 then falls under gravity back to its rest position, this movement being damped by the contraction of the cylinders 85, aided by a restrictor 134 associated with the control valve 123, and cushioned by the bumpers 105. The return movement of the control valve pushes the cable 122 to return the bell crank lever to the full line rest position of FIG. 7 which in turn, aided by the uncoiling of the spring 133, returns the sensor 116 to its rest position ready for actuation by the next pair of bales loaded into the elevator 25. Adjustment of the stop 127 and the pivotal connection 128 of the link 129 is provided to accommodate different sizes of bales to be handled by the bale wagon. It will be appreciated that as the bales enter the elevator 25, the lever 121 will be pivoted primarily during the first portion of the stroke of the sensor 116 and that towards the end of that stroke, practically no pivotal movement will be imparted to the lever 121, whereby different bale sizes have no effect on the point of actuation of the control valve 123 which is important.

Figure 9:
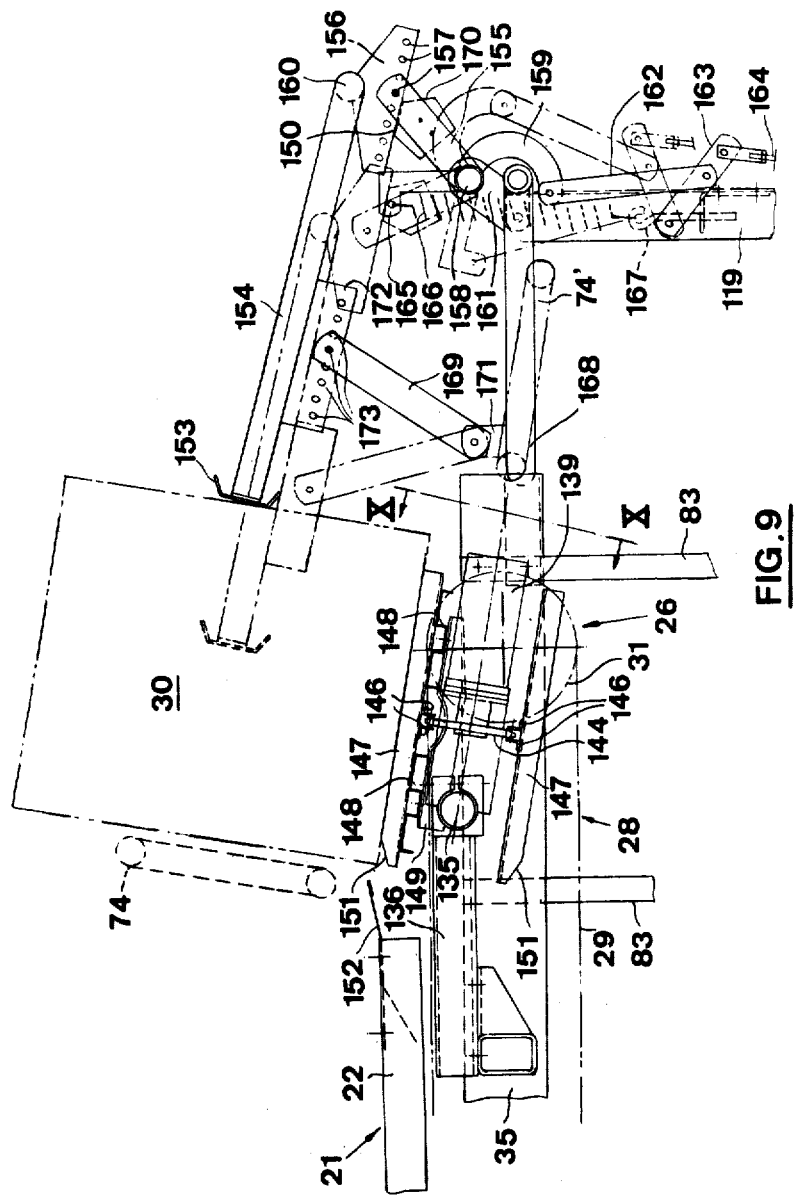
FIG. 9 is an enlarged view of the portion IX of FIG. 1.
Figure 10:
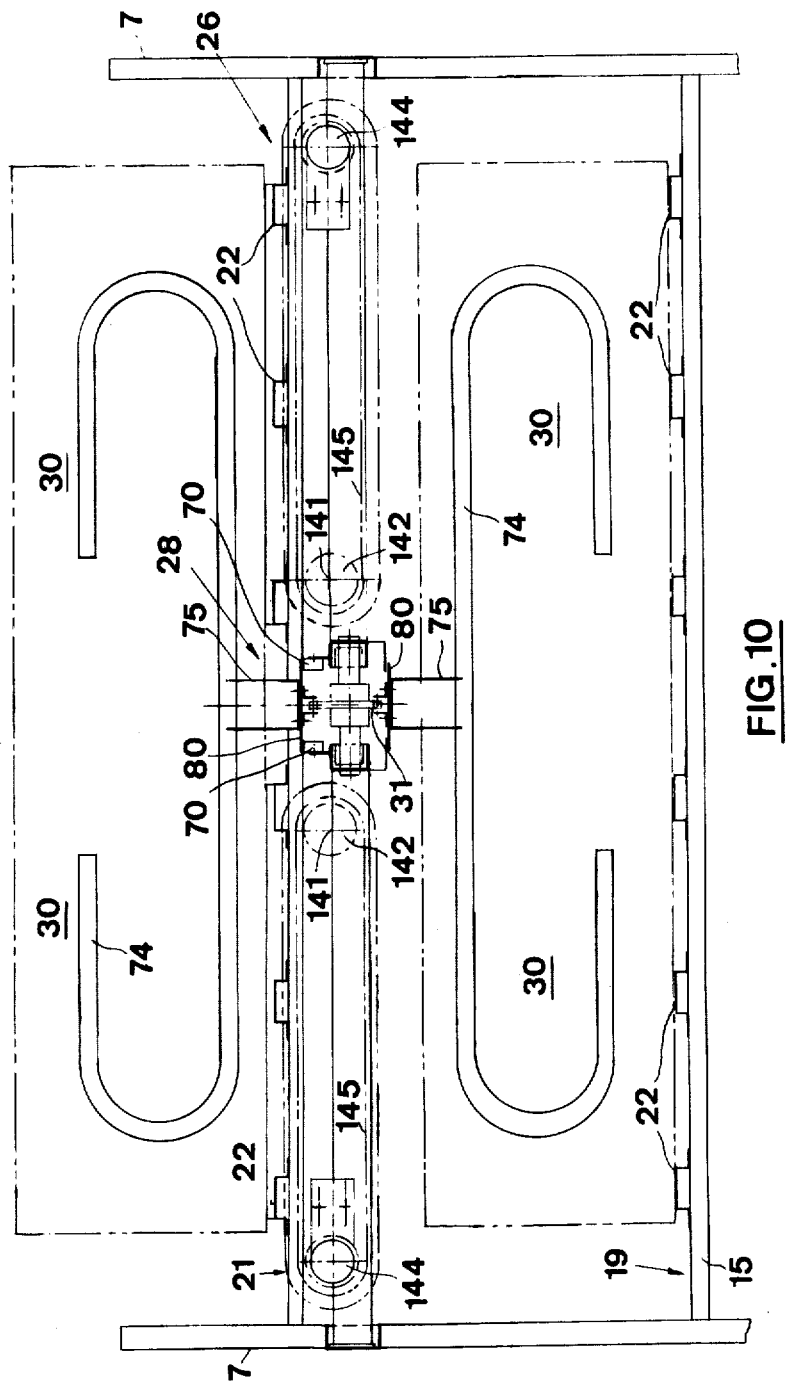
FIG. 10 is a schematic sectional view of the line X—X of FIG. 9 with certain components omitted.
Figure 11:
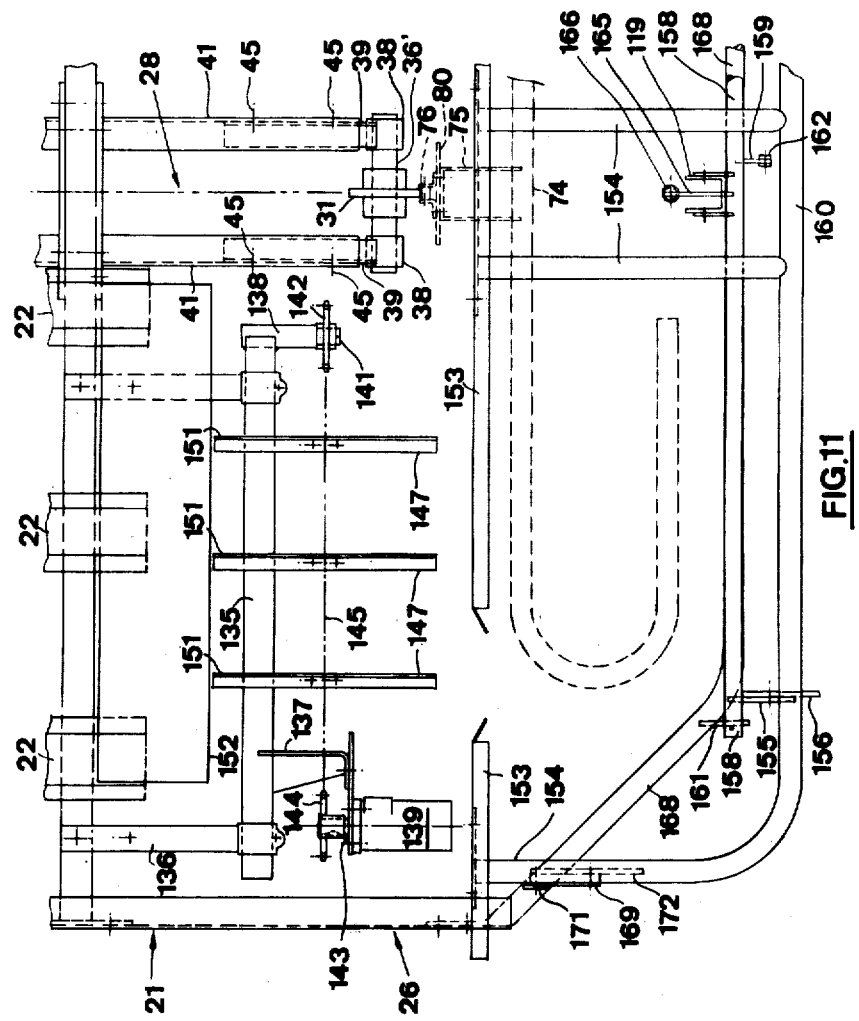
FIG. 11 is a schematic partial top view of FIG. 9 with certain components omitted.

Turning now to FIGS. 9 to 11, the bale-unloading conveyor 26 will be described. This conveyor is located at the front end of the fourth load floor 21 and extends transversely thereof to unload bales to one side or the other, as required, of the bale wagon. In fact the conveyor is in two identical halves (only one of which is shown in FIG. 11) the split being necessary to accommodate the return of the bale pushers 74 and chain 29 of the conveyor 28 to the third load floor 19. Each half of the unloading conveyor 26 is mounted on a tube 135 clamped towards each end to respective brackets 136 attached to, and extending fowardly from the forwardmost transverse beam of the main frame 6. Attached to the tube 135 are two brackets 137 and 138, the former supporting a hydraulic motor 139 and the latter carrying a stub shaft 141 for an idler sprocket 142. The output shaft 143 of the motor 139 carries a sprocket 144 and an endless chain 145 of a chain conveyor engages the driven sprocket 144 and the idler sprocket 142. Pairs of plates 146 are attached to the chain 145 at equi-spaced intervals and to each pair of plates there is attached one limb of an L-shaped conveyor slat 147. The slats 147 slide over transversely-extending floor members 148 supported from the tube 135 by support members 149. The ends of the slats 147 adjacent the end of the fourth load floor slats 22 are chamfered at 151 to prevent them snagging the bales as they move onto the unloading conveyor. A flexible, upwardly inclined floor member 152 is provided between the fourth load floor 21 and the unloading conveyor 26, the floor member terminating short of the latter so as not to be fouled thereby. The two halves of the unloading conveyor 26 are inclined downwardly forwardly of the bale wagon so as to impart a partial turn to the bales being unloaded, that turn being completed as the bales move onto a separate unloading device (not shown) at the point of storage. The inclination of the unloading conveyor is readily achieved and adjusted by the use of the support tube 135 which can be rotated relative to the brackets 136 and then clamped in position.

It is necessary to know when bales have been loaded onto the unloading conveyor 26 because as regards the bale loading operation of the wagon, this will indicate that the wagon is full, and as regards the bale unloading operation, this will indicate that the unloading conveyor can again be operated. To this end a bale-presence sensor 153 in the form of a multi-section transverse beam extends into the path of bales loaded onto the unloading conveyor 26. The sections of the sensors 153 are disposed in a manner so as to allow movement of the pushers 74 from the fourth load floor 21 back to the third load floor 19. The sensor 153 is attached to one end of each of a number of forwardly-extending arms 154, the other ends of which are attached to a rod 160 carrying brackets 156 to which are pivotally attached respective ends of links 155, the brackets providing a number of alternative pivot connection points 157 for the links 155. The other ends of the links 155 are attached to a pivot shaft 158 to which is also connected one end of a semi-circular link 159, the pivot shaft 158 being supported for rotation in brackets 161 attached to the support member 168. One end of a further link 162 is pivotally attached to the other end of the semi-circular link 159 and the distal end of the link 162 is pivotally connected intermediate the ends of a still further link 163 which is connected at one end to a push-pull cable 164 and pivotally attached at the other end to the beam 119. Also connected to the pivot shaft 158 is one limb of an L-shaped member 165 the other limb of which is attached to one end of a spring 166, the other end of which is connected to the beam 119 via a spring tension adjustment device 167. The outermost arms 154 are supported on the main frame 6 by a support member 168 connected between the beam 119 and the uppermost side member 35. Links 169 are pivotally connected both to respective brackets 171 on the support member 168 and brackets 172 on the arms 154, a number of alternative connecting points 173 for the latter being provided to allow adjustment, as with the connection points 157, to accommodate different bale sizes.

Actuation of the sensor 153 by a pair of bales being moved from the fourth load floor 21 onto the unloading conveyor 26 over the transition flooring member 152 moves the sensor 153 and associated arms 154 to the right, as seen in full lines in FIG. 9, until the brackets 156 engage the stops 150 on the links 155, which pivots the link 155, and hence the pivot shaft 158 and the semi-circular link 159, clockwise also to the full line position of FIG. 9. This movement of the link 159 moves the link 162 downwardly and hence the link 163 clockwise to push on the cable 164. The cable 164 is attached to a boomerang-shaped link 174 (FIGS. 12 and 13), which is normally in the rest position shown in full lines in FIG. 12, so that on the cable being pushed, the link is pivoted about a pivot 175 to the broken line position moving past, but not actuating, a link 176 by virtue of an L-shaped member 177 pivotably carried by the link 174 which pivots on contact with the link 176 and returns under the action of a spring 178 when clear of the latter. This movement of the link 174 does no more than set it in a particular position for a reason to be explained. It will be appreciated that the sensor 153 also acts to retain bales on the unloading conveyor 26 and prevent them from falling off the front of the bale wagon.

The start of the unloading operation is in the hands of the bale wagon operator and when a control (not shown) is operated indicating required bale-unloading to one or other side of the wagon, a control valve 179 (FIG. 26) is operated and both hydraulic motors 139 associated with the respective halves of the unloading conveyor 26 are energised to drive the chains 145, and hence slats 147, and move the bales in the desired direction to some ancilliary unloading device as already mentioned. When one pair of bales has been unloaded, a further pair has to be moved to unloading conveyor 26 and this is effected automatically by the return movement of the components 153,154,155,159,162 and 163 to the full line positions of FIG. 12 under the action of the spring 166 once the sensor 153 has been disengaged by the unloaded bales, as will be explained now in relation to FIGS. 12 and 13. The next position of the sensor 153 is defined by the stops 170 engaging the brackets 156.

Figure 13:
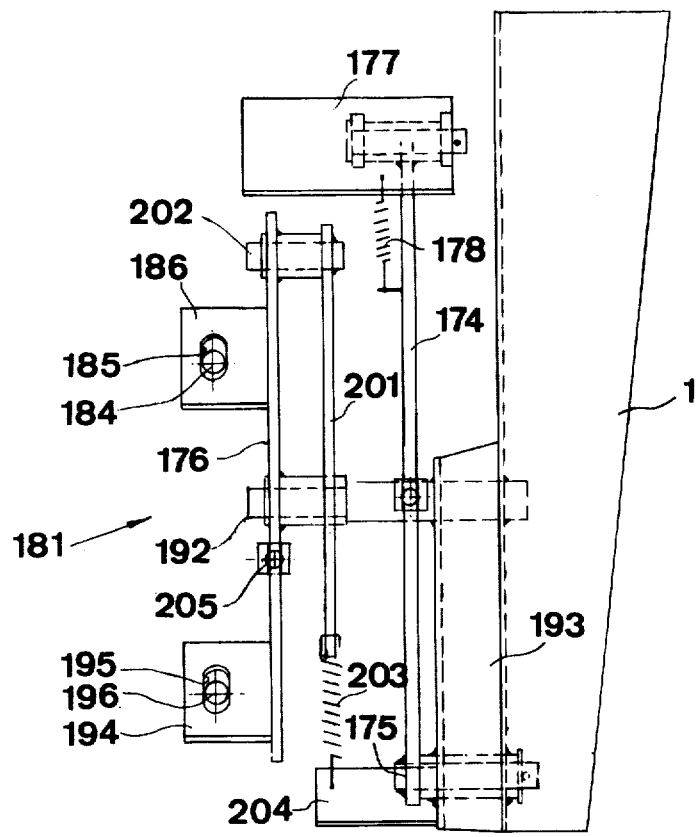
FIG. 13 is a view in the direction of arrow XIII of FIG. 12.
Figure 12:
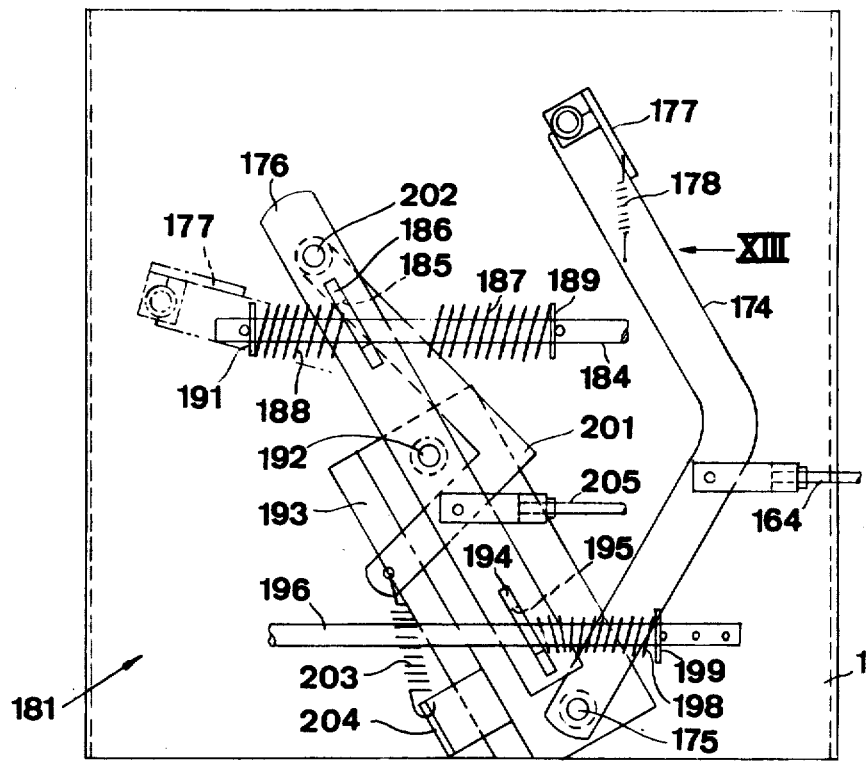
FIG. 12 is a top view, to a larger scale, of a control mechanism for the bale wagon.
Figure 17:
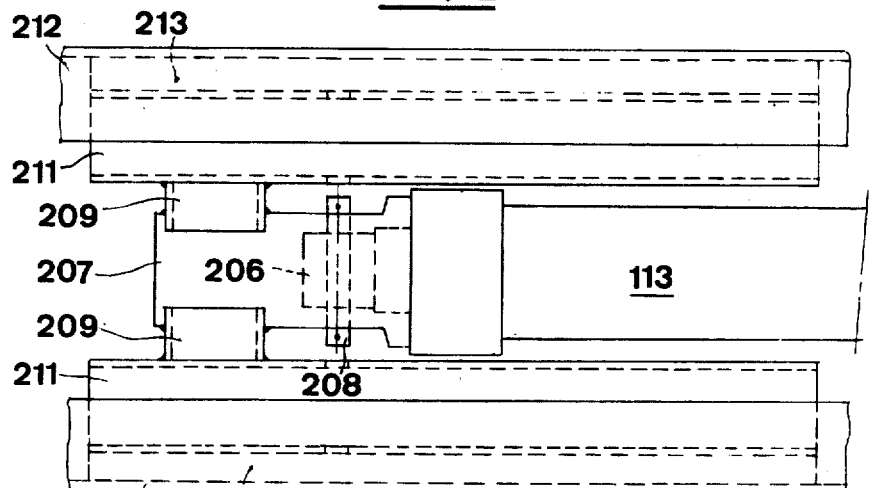
FIG. 17 is a top view of FIG. 15 with certain components omitted.

FIGS. 12 and 13 show the basic control mechanism for the bale wagon which is located adjacent the pick-up means 23 as indicated at 181 in FIG. 1. As already mentioned, the two load floor conveyors 27 and 28 are driven intermittently, the extent of each drive step being predetermined according to the size of bale being handled so that each pair of bales is moved from the pick-up means 23 by amount to clear the latter and to have the next available bale pusher 74 of the conveyor 27 in the correct position to engage and convey the bales next to be picked up by the pick-up means. The prime mover of the drive means is constituted by the master and slave cylinders 113 and 114 already referred to and serving to drive the chains 29 of the conveyors 27 and 28, respectively. The actual drive mechanisms are yet to be described.

Figure 18:
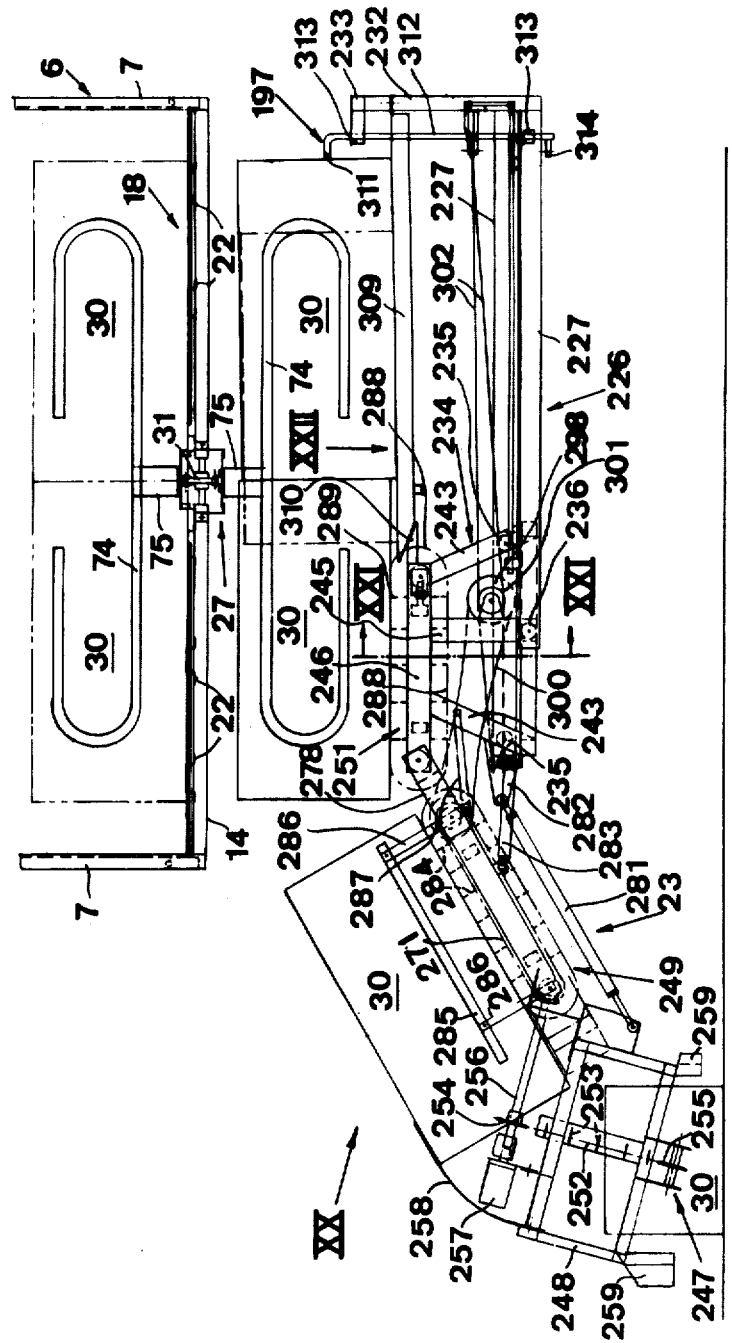
FIG. 18 is a partial front view showing the lower portion of the bale wagon with components in an operative position.

A main control valve 182 for the master and slave cylinders 113 and 114 has attached to it a rod 184 which is slidable within an elongated slot 185 provided in an extension 186 of the link 176, the rod carrying two take-up springs 187 and 188 one end of each of which abuts a respective stop 189,191 secured to the rod and the other end of each of which is engageable with the extension 186. The link 176 is pivoted intermediate its ends at 192 to a support member 193 for the mechanism being described, the support member being attached to the chassis 1. A further extension 194, similar to the extension 186 and having an elongated slot 195, is provided on the link 176, a rod 196 passing through the slot 195 and being connected to a bale-presence sensor 197 (FIG. 18) associated with the pick-up means 23 and actuated when two bales have been picked up by the latter. A take up spring 198 is carried by the rod 196 and one end abuts a stop 199 attached to that rod and the other end is engageable by the extension 194. A bell crank lever 201 is pivotally connected at one end at 202 to the link 176 and connected at the other end to a spring 203 anchored to an extension 204 of the support member 193. Finally, a push-pull cable 205 is pivotally attached at one end to the link 176 and connected at the other end to the slave cylinder 114.

Upon actuation of the sensor 197 associated with the pick-up means 23, the rod 196 is moved to the left as seen in FIG. 12 which pivots the link 176 clockwise via the take-up spring 198 acting on the extension 194. Clockwise movement of the link 176 causes the rod 184 to move to the right by virtue of the extension 186 acting on the take-up spring 187, this movement of the rod 184 causing the main control valve 182 to be operated to energise and extend the master and slave cylinders 113 and 114 to drive the conveyors 27 and 28. As the link 176 moves clockwise, the bell crank lever 201 is pivoted clockwise and tensions the spring 203, the link 176 going over centre relative to this spring to impart a positive change-over movement to the control valve 182. The use of a bell crank lever between the link 176 and the spring 203 is necessary merely to avoid the pivot 192. As the link 176 moves clockwise, the cable 205 is moved to the left but this movement is to no effect.

When the conveyors 27 and 28 have been driven by the predetermined amount, drive needs to be interrupted and this is effected by movement of the cable 205 to the right at the appropriate time by the slave cylinder 114, the latter being used as opposed to the master cylinder 113 to allow for the inevitable time lag in operation between the two. Movement of the cable 205 to the right pivots the link 176 anticlockwise back to its rest position, returning with it the rod 184 (via the take-up spring 188), the rod 196 under the action of the spring 198, and the bell crank lever 201, the link 176 again moving over centre relative to the spring 203 to give positive change-over movement to the control valve 182 which is actuated following the return movement of the rod 184 to energise in the opposite direction and retract the master and slave cylinders 113 and 114 ready for the next drive step. Upon return movement of the rod 196 the sensor 197 is returned by a spring (not shown) to the correct position for sensing the presence of the next pair of bales picked up by the pick-up means.

Returning to the operation of the unloading conveyor 26 and the interaction with the main drive control mechanism, it will be seen that once a pair of bales has been unloaded by the conveyor 26, the link 174 will be returned to its full line (rest) position of FIG. 12 by movement of the cable 164 to the right (as a result of the return movement of the link 163) and in so doing will pivot the link 176 clockwise due to the engagement thereof by the member 177 carried by the link 174. This movement of the link 176 initiates another drive sequence for the conveyors 27 and 28 in the manner just described so that another pair of bales is moved to the unloading conveyor. It will be appreciated that the movement of the link 176 by the link 174 is independent of the status of the sensor 197 in the pick-up means 23 and also that unloading is accomplished fully automatically once the valve 179 has been set for unloading.

The main drive mechanisms as actuated by the respective master and slave cylinders 113 and 114 and associated with the respective chain conveyors 27 and 28 will now be described with reference to FIGS. 14 to 17 which show the mechanism associated with the master cylinder 113. The other drive mechanism is identical. The master cylinder 113 is mounted on one of the transoms 14 so as to be disposed between the runs of the associated chain 29. The piston 206 of the master cylinder 113 is received within a tubular member 207 and pinned thereto by a pivot shaft 208. The member 207 has welded to it two diametrically opposed members 209 which in turn are welded to respective square-section tubes 211 slidable in slides 212 lined with low friction liners 213 and extending, and secured to, between two adjacent transoms 14. A U-shaped member 214 is pivotally attached to the member 207 via the pivot shaft 208 and has depending from its central limb an L-shaped chain drive member 215 having an arcuate recess 216 at its outer end for engagement with a selected cross member 217 of the chain 29. The drive member 215 is urged to a generally horizontal, non-driving, position by a spring 218 and is pivotable to the drive position shown in FIG. 15 by a lever 219 pivotally mounted at 221 on an extension 222 on one side of the member 214. The lever 219 extends downwardly with its lower end 223 always below the plane of the plates 80 by which the bale pushers 74 are attached to the chain 29, that is the plane of these plates as appear in the lower run of the chain. The upper end of the lever 219 has a recess 224 engageable with a pin 225 carried by the member 214.

Figure 14:
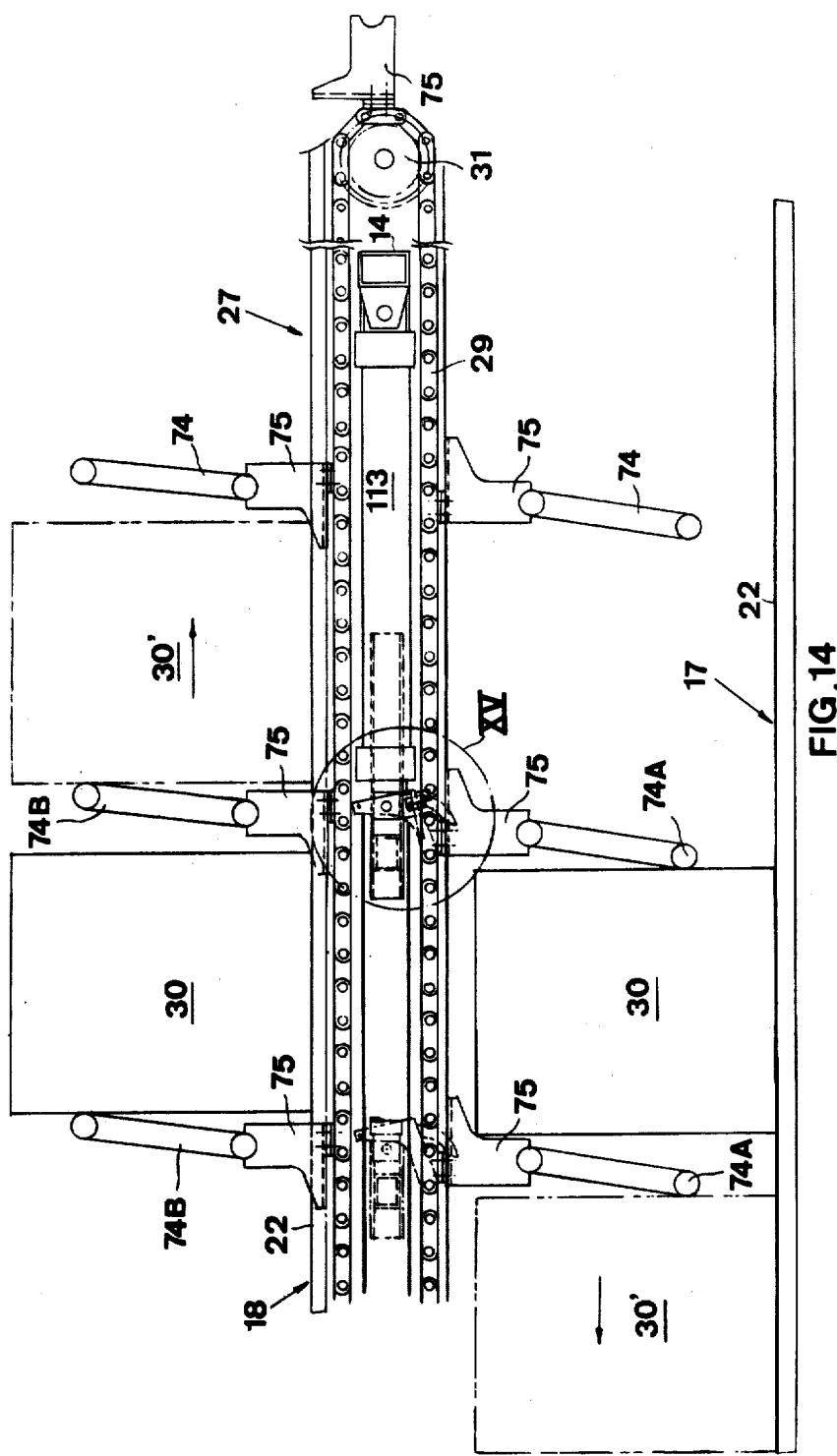
FIG. 14 is an enlarged view of the portion XIV of FIG. 1.
Figure 15:
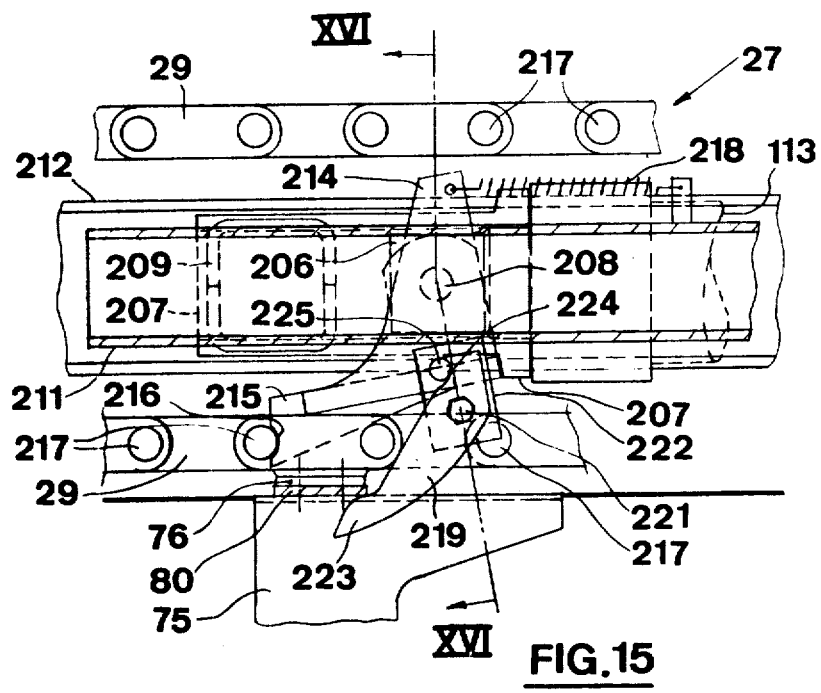
FIG. 15 is an enlarged view of the portion XV of FIG. 14.
Figure 16:
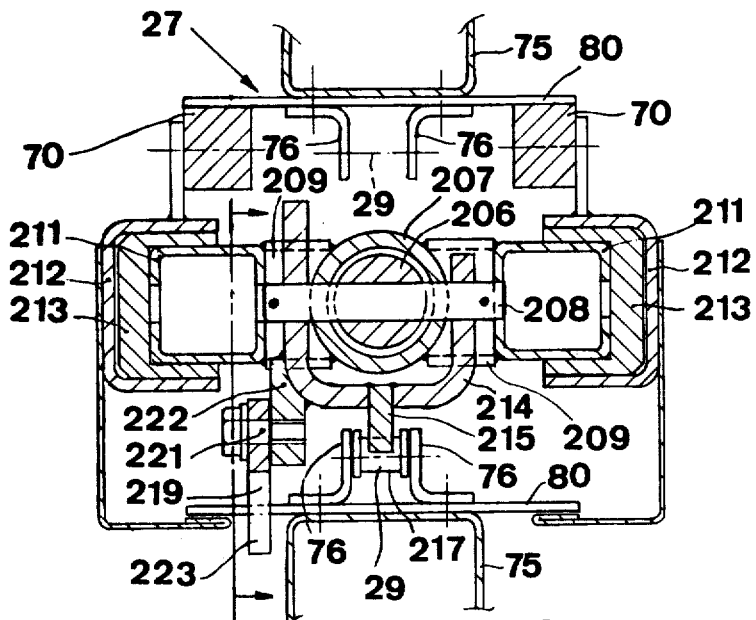
FIG. 16 is a section on the line XVI—XVI of FIG. 15.

Starting from the rest position of the master and slave cylinders 113 and 114, actuation of the latter in the manner already described extends the respective pistons 206 which move the respective tubular members 207 relative to the chains 29 until such time as the end 223 of the lever 219 engages the next plate 80 in its path associated with the next bale pusher 74A (FIG. 14) in its path. Engagement of the lever 219 with the plate 80 pivots the lever anticlockwise, as seen in FIG. 15, and causes the recess 224 therein to engage the pin 225 on the member 214 and hence pivot the latter such that the drive member recess 216 engages the next chain cross member 217. Thus drive is imparted to each chain 29 until such time as the master and slave cylinders 113 and 114 are de-energised and the pistons 206 thereof retracted. Retraction of the pistons 206 prepares the master and slave cylinders 113 and 114 for the next drive step and is not hindered by the lever 219 and drive member 216 which ride over any plate 80 and chain cross members 217 in their respective paths although the drive member 216 is raised clear of the latter by the spring 218. Thus the starting point of each drive step is the same for each conveyor 27 and 28 as determined by the engagement of the lever ends 223 with the appropriate plates 80 so that the loading or unloading procedure is not adversely affected by any inadvertent chain movement between drive steps. At the end of the drive step described with reference to FIGS. 14 to 17, the bale 30 engaged by the bale pusher 74A will be in the broken line position of 30' as will the bale engaged by the bale pusher 74B on the upper run of the chain 29 as seen in FIG. 14. It will be noted that the bale pushers 74A and 74B are shown in their nominal positions relative to the adjacent face of the bales and are not shown flat against those faces as will be the case in actual use of the bale wagon.

The last main component of the bale wagon is the pick-up means 23 which will now be described with reference to FIGS. 18 to 25. As already mentioned, the pick-up means 23 is mounted at the front, and to one side, of the bale wagon and it is movable between an operative (FIG. 18) and an inoperative (FIG. 19) position transversely of the bale wagon, whereby at least part of the pick-up means is contained, in the inoperative position, within the width of the wagon so as to reduce the overall width of the latter for transport purposes.

The pick-up means 23 comprises a sub frame 226 mounted on the chassis 1 across the two members 2 thereof at the location where they converge at the front of the wagon. The sub frame 226 comprises two parallel side members 227 extending transversely of the wagon and interconnected at one end by an end member 228, the members 227 and 228 being formed from square section tubing and the two side members being displaced vertically relative to each other. Slide and guide channels 229 and 231 are provided on the respective inwardly facing sides of the two side members 227 and uprights 232 extend from respective ends of the end member 228, being interconnected by a further end member 233. The sub frame 226 supports a carriage 234 for sliding movement in the slide channels 229 and 231 by way of two rear rollers 235 associated with the channel 229 and a front roller 236 associated with the channel 231. The rollers 235 and 236 are carried at the ends of respective support members 237 and 238 extending from the frame of the carriage comprising lower front and rear members 239 and 241 interconnected by two forwardly-converging members 242. The carriage frame further comprises two rear, upwardly-extending and converging members 243 connected between the lower rear member 241 and an upper rear member 244, and one front upwardly-extending member 245 connected between the lower front member 239 and an upper front member 246. The upper front and rear members 246 and 244 extend transversely of the wagon parallel to each other.

As regards bale pick-up components, the pick-up means comprise an endless elevator 247 (FIGS. 18, 19 and 20) mounted in a sub frame 248, an inclined, endless chain conveyor 249, and an endless chain, generally horizontal conveyor 251 mounted on the carriage 234, the inclined conveyor being disposed between the elevator and the horizontal conveyor. The elevator 247 comprises an endless chain 252 having bale-conveyor members 253 attached thereto at equispaced intervals, the chain extending around a driven sprocket 254 and an idler sprocket 255. The driven sprocket 254 is attached to a shaft 256 driven by an hydraulic motor 257. It will be seen from FIGS. 18 and 20 that the line of action of the elevator 247, as defined by the forward and operative run of the chain 252, is inclined rearwardly of the wagon by an angle of 10° and upwardly inclined towards the inclined conveyor 249 by an angle of 15°, the former inclination helping to maintain a bale being elevated in contact with the elevator, and the latter inclination imparting a partial turn to a bale being elevated in readiness for transfer to the inclined conveyor 249. A resilient bale guide and deflector 258 is mounted on the frame 248, together with guide members 259 disposed on either side of the frame and operable to guide bales approached by the pick-up means 23 towards the elevator 247 as the bale wagon is driven over a field in which the bales are dispersed.

In order for the elevator 247 to operate efficiently, it is necessary to provide bale holding means 261 (seen in FIGS. 20 and 23-29 but not shown in FIGS. 18 and 19) constantly to urge a bale into contact with the elevator throughout the elevating process. The bale holding means 261 are mounted on the frame 248 and comprise a planar shoe in the form of a relatively heavy metal plate 262 contactable with the top face of a bale entering the pick-up means 23 and having side flanges 263 and a curved heel portion 264. The plate 262 is pivotally suspended from the frame 248 by three links; firstly by a rigid link 265 pivotally attached at one end to a bracket 266 on the plate and at the other end to a bracket 267 on the frame 248; secondly a link in the form of a chain 268 having a length equal to that of the rigid link 265 and pivotally attached at one end to the bracket 267 below the point of attachment of the rigid link thereto and pivotally attached at the other end to the bracket 266; thirdly a link also in the form of a chain 269 pivotally attached at respective ends to the brackets 266 and 267, the point of attachment to the bracket 267 being above that of the rigid link and the point of attachment to the bracket 266 being coincident with that of the other chain link 268. The chain links 268 and 269 are operative or inoperative according to the orientation of the plate 262 relative to the frame 248 but when operative, the link 268 forms a parallelogram with the rigid link 265, and the line of action of the link 269 crosses that of the rigid link. A spring 270 also interconnects the brackets 266 and 267.

Figure 23:
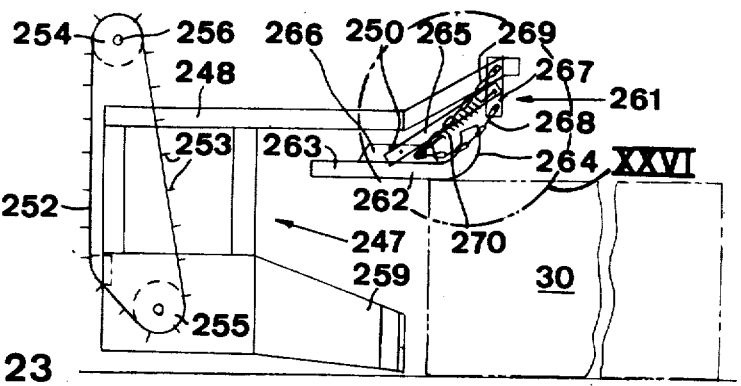
Figure 24:
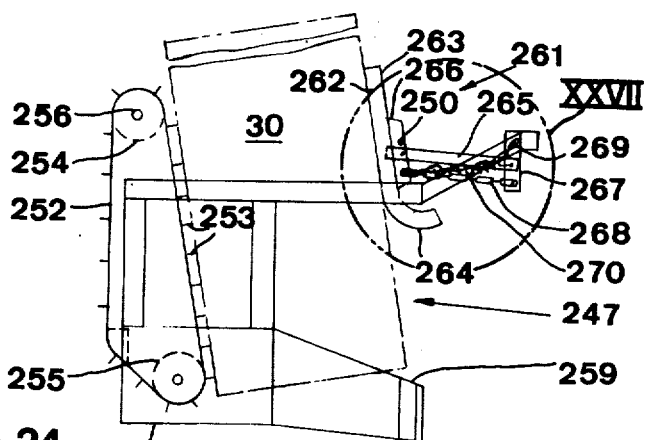
Figure 25:
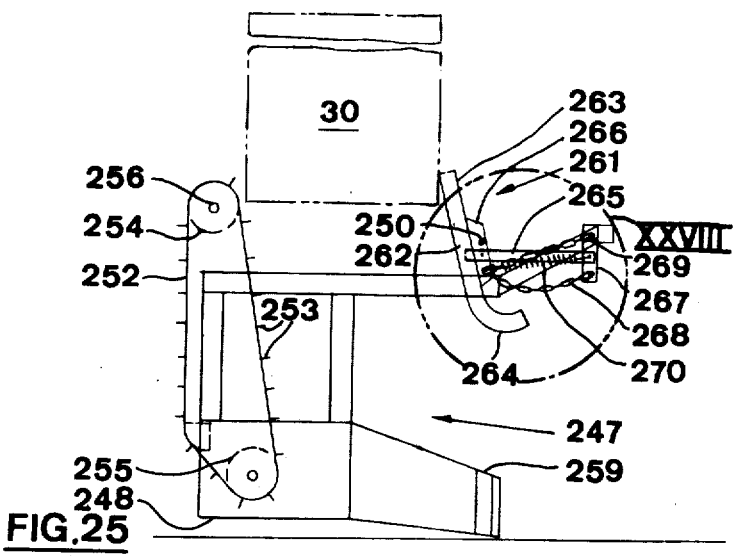

In the rest position of the bale holding means as seen in FIGS. 23 and 26, the plate 262 is generally horizontal, that is generally perpendicular to the plane of action of the operative run of the elevator chain 252, ignoring the rearward inclination thereof. The height from the ground of the plate 262 in the rest position is substantially equal to height of a bale 30. The third link 269 is taut in the rest position of the bale holding means so that, in conjunction with the rigid link 265 and a stop 250 on the bale holding means 261 engaging the rigid link 265, it holds the plate 262 in the required position. The elevator 247 first engages the end of a bale fed thereto by movement of the bale wagon relative to the bale, lifts that end and then engages the face of the bale previously contacting ground so that the bale is then in the position shown in FIGS. 24 and 27.

The plate 262 pivots about its pivotal connection with the rigid link 265 as the end of the bale is lifted and is raised at the same time due to the line of action of the third link 269 crossing the line of action of the first link 265, this movement being accommodated by the pivotal connection between the rigid link and the bracket 267 on the frame 248. This re-orientation of the plate 262 results in the chain link 268 becoming taut, and hence effective, to form the parallelogram with the rigid link 265 and whereafter the chain link 269 becomes slack, and hence ineffective. It will be seen from FIG. 25 that the plate 262 is parallel to the operative run of the elevator chain 252 and the parallelogram formed by the links 265 and 268 will maintain this orientation irrespective of any variation in the thickness of the bale so that the bale is positively urged into contact with the elevator by the weight of the plate 262 and the associated components and by the spring 270.

As the bale is further elevated by the elevator, it falls towards the inclined conveyor 249 and is eventually totally transferred to the same. As this transition takes place, the area of contact between the plate 262 and the bale gradually reduces (FIGS. 25 and 28) with the result that the plate drops downwardly about the pivotal connection between the rigid link 265 and the bracket 267 and the chain link 269 again becomes taut and causes the plate 262 to tilt anticlockwise about the pivotal connection between the rigid link and the bracket 266 whereupon the chain link 268 again becomes slack. The chain link 269 causes the plate 262 to continue the anticlockwise tilting to ensure contact of the latter with the bale until the last possible moment.

The illustrated bale holding means 261 are very effective in holding a bale against the elevator 247 throughout the action of the latter thereon which thus improves the action of the elevator in making it more positive so that there is little or no hesitancy in the picking up of bales.

The inclined conveyor 249 comprises a chain 271 extending around spaced sprockets 272 and 273 mounted on respective shafts 274 and 275, the former shaft being supported on the sub frame 248 and driven by the hydraulic motor 257 through a bevel gear arrangement 276 between the shafts 274 and 256. The shaft 275 is supported between two side members 277 of the inclined conveyor, the side members being rigidly connected to respective ends of links 278 the other ends of which are pivotally attached to the carriage frame about a shaft 279 associated with the horizontal conveyor 251. The sub frame 248 is pivotally attached to the inclined conveyor 249 about the shaft 274 and pivotally attached to one end of a strut 281 the other end of which is pivotally connected to a bracket 282 extending from the carriage frame. Thus the elevator 247 is suspended from the carriage frame by a parallelogram arrangement comprising the strut 281 on the one hand and the combined side members 277 and links 278 on the other hand, whereby the orientation of the elevator remains the same relative to the ground irrespective of the position of the inclined conveyor 249 relative to the horizontal conveyor, which position changes according to whether the pick-up means 23 is in the operative or inoperative position, as will be explained. Pivotal movement of the inclined conveyor 249 relative to the horizontal conveyor 251 is effected by a hydraulic cylinder 283 connected between the inclined conveyor and the carriage frame and which may be coupled to the hydraulic system of the tractor which in use tows the wagon. The chain 271 carries relatively aggressive bale-engaging and conveying members 284 at spaced intervals therealong.

Figure 19:
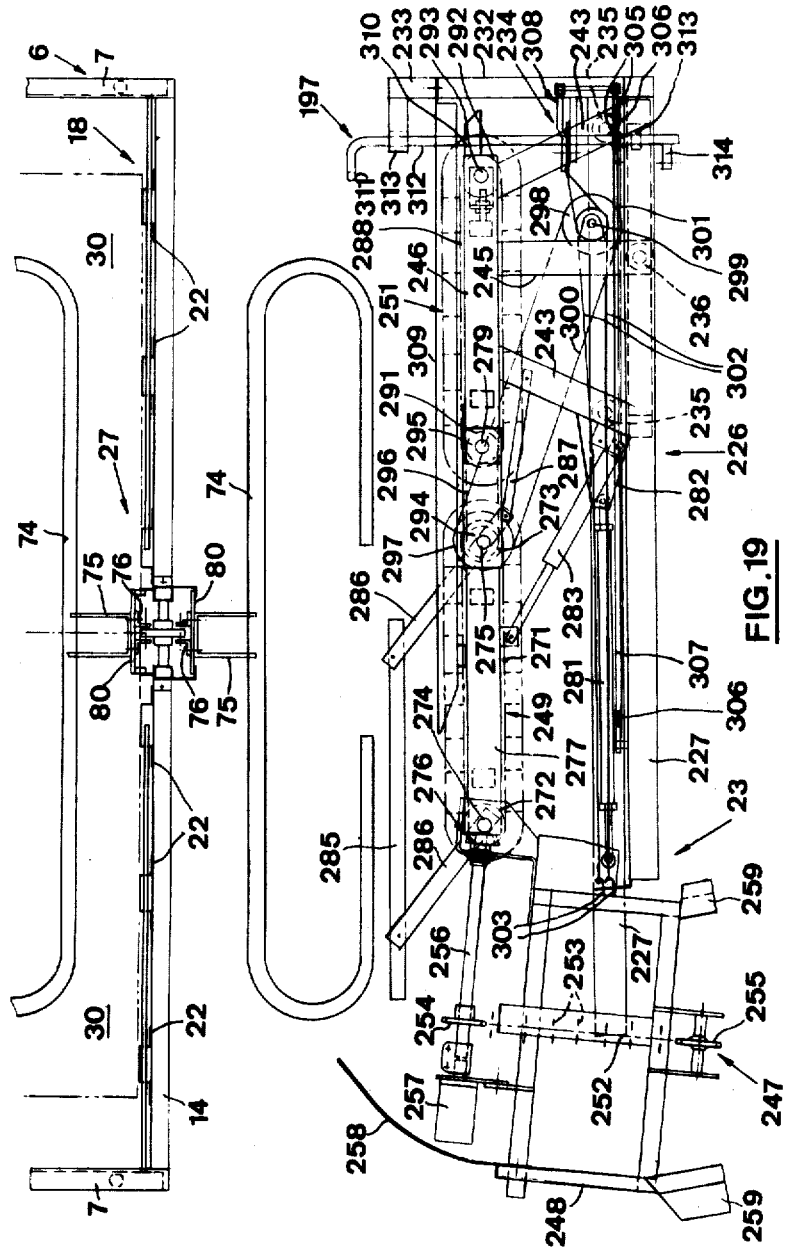
FIG. 19 is a view similar to FIG. 18 but showing certain components in an inoperative or transport position, and to a larger scale.
Figure 20:
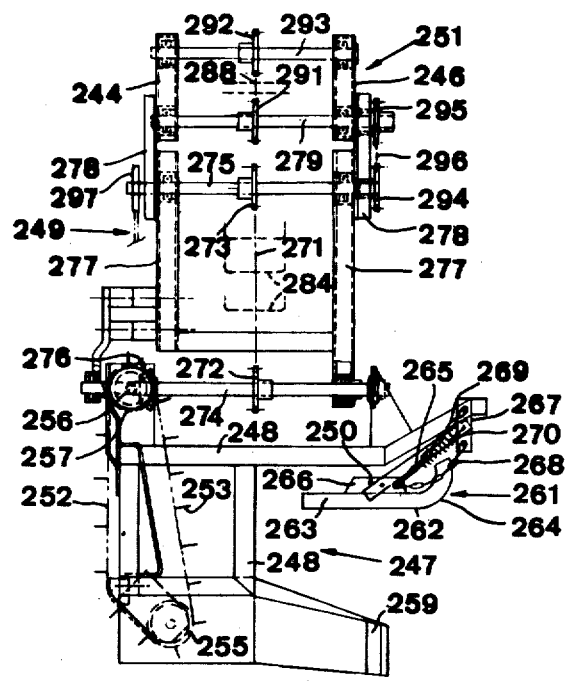
FIG. 20 is a view in the direction of arrow XX of FIG. 18.
Figure 21:
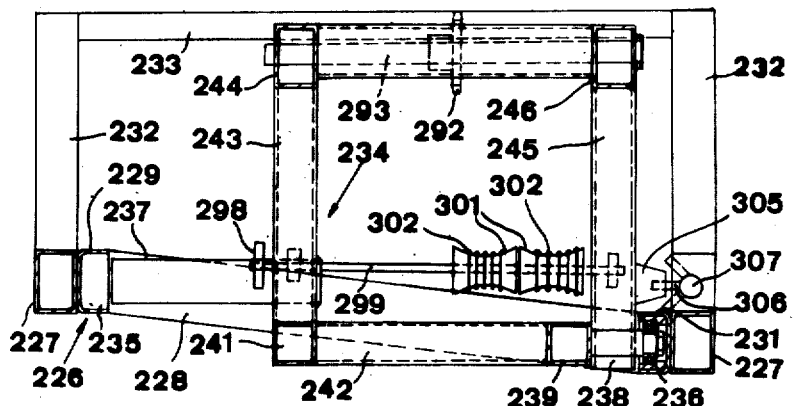
FIG. 21 is a section on the line XXI—XXI of FIG. 18.
Figure 22:
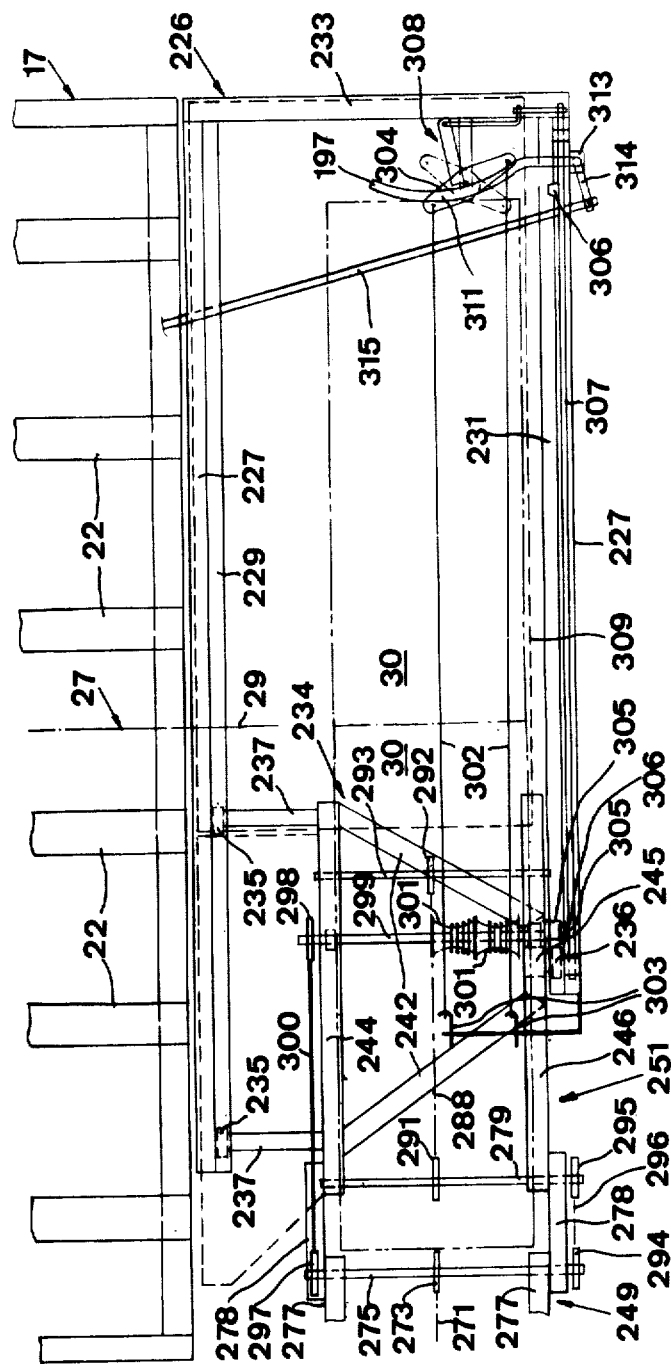
FIG. 22 is a partial view in the direction of arrow XXII of FIG. 18, FIGS. 23 to 25 are diagrammatic views of the lower portion of FIG. 20 showing certain components in different operative positions.

The rear of the inclined conveyor 249 is fitted with a bale guide and retainer rail 285, pivotally attached at spaced points to two arms 286 in turn pivotally mounted on the respective shafts 274 and 275, the four pivot points defining the corners of a parallelogram. The right-hand arm 286 as seen in FIG. 19 is extended downwardly and is pivotally attached to one end of a link 287 the other end of which is pivotally attached to the carriage frame. Thus as the inclined conveyor 249 is pivoted upwardly relative to the horizontal conveyor 251, the link 287 pulls on the extension of the right-hand arm 286 partially to collapse or fold the rail 285 so that it will not foul other components when the pick-up means 23 is moved to the transport position of FIG. 19.

Turning now to the horizontal conveyor 251, this comprises a chain 288 carrying bale-engaging and conveying members 289 which are less aggressive than those of the inclined conveyor 249 and are in the form of L-shaped members extending transversely of the chain such that adequate bale conveyance is effected thereby without any interference in the subsequent transfer of the bales to the first load floor 17. The chain extends around sprockets 291 and 292, the sprocket 291 being attached to the shaft 279 and the sprocket 292 to a shaft 293 supported on the carriage frame between the members 244 and 246 thereof. The horizontal conveyor 251 is driven by the hydraulic motor 257 from the inclined conveyor shaft 275 which carries a sprocket 294 (FIGS. 19 and 20) drivingly connected to a sprocket 295 on the shaft 279 by a chain 296. The hydraulic motor 257 is controlled by the valve 179 (FIG. 26) which also controls the hydraulic motors 39 of the bale unloading means 26, the valve being such that if the motor 257 is energised, the motors 257 are de-energised and vice versa. Furthermore, the relationship between the control valve 179 and the control valve 182 for the master and slave cylinders 113 and 114 is such that the motor 257 is de-energised when the conveyors 27 and 28 are driven so that the drive to the elevator 247, inclined conveyor 249 and horizontal conveyor 251 is interrupted when bales are being transferred from the transfer table to the first load floor 17 or otherwise moved through the bale wagon.

The shaft 275 also carries a pulley 297 and a further pulley 298 is provided on a shaft 299 supported in brackets extending from the respective members 239 and 241 of the carriage frame and disposed to one side and below the shaft 275. A belt 300 extends around the pulleys 297 and 298. Two capstans 301 (FIGS. 21 and 22) are mounted on the shaft 299 each having a rope or cable 302 therearound to form two capstan clutches, the rope of one capstan being wound oppositely to that of the other capstan. One end of each rope 302 is attached to the chassis at 303 and the other end attached to a pivotal control member 304 (FIG. 22) movement of which by the bale wagon operator tensions one or other of the ropes which then clutches the associated capstan 301 whereupon the carriage, and hence entire pick-up means 23, is moved in one direction or another, as required, along the guide channels 229 and 231. This movement can only occur when the inclined conveyor 249 has been pivoted to a horizontal position, by actuation of the cylinder 283, in line with the horizontal conveyor 251 as seen in FIG. 19 because it is only in this position that the drive belt is tensioned between the pulleys 297 to 298 to impart drive to the shaft 299 and capstans 301. In the operative position of the pick-up means shown in FIG. 18, the pulleys 297 and 298 are positioned closer together so that the belt 300 is slack and the drive to the shaft 299 and capstans 301 interrupted. The carriage is lockable in the operative and inoperative position of the pick-up means 23 by a locking device comprising a pair of stops 305 attached to the carriage and engageable with one or other of two latches 306 carried by a shaft 307 according to whether the pick-up means is in the operative or inoperative position. The shaft 307 is rotatable by a linkage system 308 connected to the control member 304 so that the latches are either in the operative position shown in full lines in FIG. 21 or one of two inoperative positions shown in broken lines.

The horizontal conveyor 251 forms part of a transfer table extending the width of the first load floor 17 and further comprising a floor portion 309 extending from, and hingedly attached to, the frame 226 and slightly overlapping an inclined member 310 of the horizontal conveyor 251. The floor portion 309 extends downwardly towards the horizontal conveyor 251 so that as the latter moves from the operative to the inoperative position of the pick-up means the floor portion is hinged upwardly to allow the carriage to move thereunder to the position of FIG. 19. It will be noted that the dimensions of the horizontal conveyor 251 and the floor portion 309 transversely of the bale wagon are such that a first bale loaded on to the transfer table by the pick-up means 23 sits on the left-hand end of the floor portion 309 as seen in broken lines in FIG. 18. As a second bale is picked up and is eventually conveyed by the horizontal conveyor, it pushes the first loaded bale further along the floor portion 309 until it contacts the bale sensor 197 to initiate a drive step of the conveyors 27 and 28 as already described, whereupon the next available bale pusher 74 of the conveyor 27 sweeps down from the second load floor 18 and engages the bales on the transfer table and moves them onto the first load floor 17. As this transfer movement takes place, the sensor 197 is disengaged and the rod 196 attached thereto returned to its original position. The sensor 197 is in the form of a tubular member having an arcuate portion 311 (as seen in plan view—FIG. 22) which is engageable by a bale, a generally vertical portion 312 passing through spaced bushes 313 provided on the frame 226 and a horizontal portion 314 pivotally attached to a linkage system, shown partially at 315, connected to impart appropriate movement to the rod 196, associated with the drive control mechanism described with reference to FIGS. 12 and 13. Thus when a bale engages the portion 311 of the sensor 197, the latter pivots in the bushes 313 and moves the rod 196 in the required direction.

Figure 29:
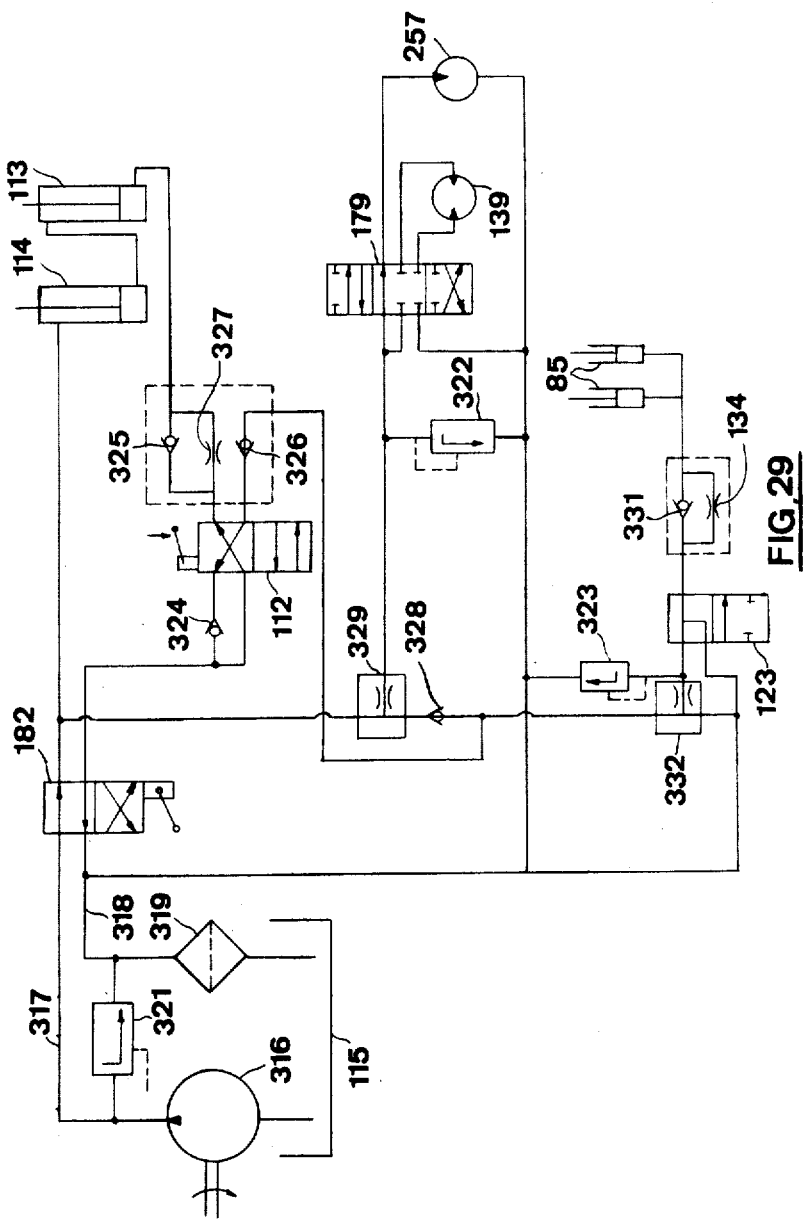
FIG. 29 is a circuit diagram of the hydraulic control system for the bale wagon.

The operation of the bale wagon is controlled by a hydraulic system the circuit diagram of which is shown in FIG. 29. Certain components of the hydraulic circuit have already been referred to in the above description. The circuit further comprises a hydraulic pump 316 which is driven from the tractor PTO and which is connected to a pressure line 317 and a return line 318 connected to the reservoir 115 by a filter 319. Pressure relief valves 321, 322 and 323 are associated with the main control valve 182, the loading/unloading control valve 179 and the elevator control valve 123, respectively. Three non-return valves 324, 325 and 326 and a restrictor 327 are associated with the elevator safety valve 112; a non-return valve 328 and a flow divider 329 with both the valves 123 and 178; and a non-return valve 331 and a flow divider 332 associated with the valve 123 in addition to the restrictor 134.

The circuit of FIG. 29 is shown in basic rest or neutral position in which only the hydraulic motor 257 of the pick-up means is energised so that bales can be picked up from the ground and loaded onto the transfer table formed by the horizontal conveyor 251 and the floor portion 309. When the sensor 197 senses the presence of two bales on the transfer table, the main control valve 182 is changed to its alternative position by the mechanism of FIGS. 12 and 13 and the master and slave cylinders 113 and 114 energised to drive the conveyors 27 and 28 and hence transfer the bales on the transfer table to the first load floor 17 and progress any bales already on the load floors 17,18,19 and 21 therealong by one step. This change over of the main control valve 182 connects the motor 257 to the reservoir 115, i.e. de-energises the same so that the drive to the pick-up means is interrupted as already explained. On completion of the drive step, the main control valve 182 is changed back to the position of FIG. 26, thereby re-establishing drive to the pick-up means 23 and retracting the master and slave cylinders 113 and 114.

If during the last drive step bales have been moved into the elevator means 25, the sensor 116 in the latter will have been actuated to operate the main elevator control valve 123 but this will not effect energisation of the cylinders 85 because the cylinders 85 are connected to the reservoir whilst the main control valve 182 is operated to energise the master and slave cylinders 113 and 114. When the main control valve 182 changes back to its original position on completion of the drive step, the cylinders 85 are then energised and the elevator means 25 raised. This movement changes over the elevator safety valve 112 as the button 109 is disengaged by the elevator means, whereby the master and slave cylinders cannot be energised to extend. As the elevator means 25 returns to its rest position after having lifted two bales to the third load floor 19, the button 109 is re-engaged and the safety valve 112 reset. Also, the sensor 116 is disengaged by the bales previously thereon and returned to its rest position. As the elevator means 25 reaches its top position, the lever 125 pulls the cable 124 upwards and hence the valve 123 is returned to its original position of FIG. 26 and the lever 121 pivoted anticlockwise. It should be noted that operation of the elevator means 25 does not prevent drive being imparted to the pick-up means 23 so that further bales can be placed on the transfer table during operation of the elevator means 25.

OPERATION

The general operation of the illustrated bale wagon has already been described in brief and will now be elaborated a little. Assuming the bale wagon to be empty, it is towed over a field in which bales of crop material are dispersed and steered towards bales in turn in such a way that each bale enters the pick-up guides 259 and engages the pick-up elevator 247. The first bale is elevated by the elevator 247, passed to the inclined conveyor 249 and thence to the horizontal conveyor 251 which transfers the bale to the adjacent end of the floor portion 309 of the transfer table. In this position, the first bale is out of engagement with the sensor 197 but engages the same on being pushed further onto the floor portion 309 by the next bale which is picked up from the ground. This initiates a drive step for the conveyors 27 and 28 as explained with the result that the first pair of bales is transferred to the first load floor 17.

Further pairs of bales are loaded onto the first load floor 17 in a similar manner, the pairs already on that floor being moved step by step therealong. When the first pair of bales reaches the end of the first load floor at the rear of the wagon, it is transferred to the second load floor 18 with the aid of the bale support means 24. Those and subsequent bales are then moved step by step forwardly of the wagon along the second load floor until they reach the front thereof and enter the elevator means 25. The elevator sensor 116 is thus actuated and elevator raised once the drive step moving the bales into the elevator has been completed. The trap doors 91 and 92 are opened by the bales as they are elevated and automatically close as the elevator clears the same (by about 5 cms) so as to support the bales as the elevator returns to its rest position. On the next drive step, the elevated bales are moved by the conveyor 28 from the floor portion formed by the trap doors 91 and 92 on to the main portion of the third load floor 19 and, again step by step, therealong rearwardly of the wagon until the end of that floor is reached. At this point, the second bale support means 24 aid in the transfer of the bales to the fourth load floor 21 after which they are moved step by step forwardly of the wagon to the front of the load floor and onto the unloading conveyor 26. Movement on to the conveyor 26 actuates the sensor 153 and sets the link 174 (FIG. 12) as described above. Some form of indication to the operator may be provided, such as an audible warning device, to advise when the wagon is full. The start of the unloading of the wagon is under the control of the operator and once started if fully automatic as already described.

It will be noted that the bale support means 24 are operated on each drive step of the conveyors 27 and 28 irrespective of whether any bales are present for transfer from one load floor to another but that the elevator means 25 is only actuated when bales are present therein. Also, it will be seen that each pair of bales is engaged throughout its movement through the wagon by one and the same bale pusher 74 which effects very positive bale control and movement.

FIG. 1 of the drawings shows that the transfer table is located beneath the front end of the second load floor 18 which means that bales have to be delivered to the table in a relatively confined space. This is no problem with the use of the two conveyors 249 and 251 as the latter feeds the bales horizontally whereby the minimum of headroom is required. However, it will be appreciated that other and conventional pick-up means may be used with a bale wagon constructed in accordance with the present invention.

As bales are swung through 180° on being transferred from the first load floor 17 to the second load floor 18, increased headroom between the second and third floors 18 and 19 is required to provide adequate room for this bale movement even though the damper spring fingers 79 are provided. To this end, the third load floor 19 is slightly inclined upwardly at its rear end to give the desired increased headroom between the second and third load floors 18 and 19. Furthermore, the front end of the first load floor 17 is inclined downwardly to increase the headroom between that floor and the second load floor 18 at the front which is necessary to allow the pick-up means 23 properly to load bales on the transfer table formed by the horizontal conveyor 251 and the floor portion 309. The forward end of the fourth load floor 21 is slightly upwardly inclined to compensate for the downward inclination of the unloading conveyor 26.

It has been mentioned that the illustrated bale wagon is adaptable to different sizes of bales in the sense that some baling machines produce a bale of a nominal size different from that of other balers. In addition to adjustment of some of the linkages associated with the control mechanisms in the described manner, the distance between the bale pushers 74 has to be changed to accommodate a different bale size, together with the size of the sprockets 31 and 32 of the conveyors 27 and 28. Ideally, the diameter of the front sprockets 31 is zero so that a pusher 74 returning from one floor to the floor below does so instantaneously to engage the next pair of bales. However, a convenient compromise has been found to be a circumference equal to desired movement of the bales during each drive step. In this way, the pushers 74 at the front end of the wagon at the end of a drive step extend generally horizontally, i.e. they are halfway between the two load floors which they serve.

When the bale wagon is to be transported on public highways, the overall width has to be reduced, assuming the effective width as regards bale capacity is maximised, and this is achieved in the illustrated embodiment by energising the cylinder 283 to pivot the inclined conveyor 249 to a position in alignment with the horizontal conveyor 251 and then sliding the entire pick-up means 23 transversely of the wagon by operating the control 304 and hence energising the appropriate capstan clutch 301,302. The transfer table needs to be clear of bales for this operation.

FIG. 19 shows that the pick-up means 23 is stowed within the width of the load floors when in the fully retracted, inoperative or transport position.

It will be appreciated that the illustrated embodiment may be changed in many respects without departing from the invention. For example, it has been mentioned that the chain conveyors 27 and 28 are associated with even numbered load floors (18 and 21), that the bales are transferred from the odd numbered load floors (17 and 19) to the even numbered load floors by the conveyors in conjunction with the bale support means 24, and that the elevator means 25 extends between the even and odd numbered load floors 18 and 19. However, it is possible to provide an additional load floor with a different conveyor below the first load floor 17 of the illustrated embodiment and the terms "even numbered" and "odd numbered" should be construed accordingly. Also, instead of loading bales one high on each load floor, it is possible to load bales two or more high with an appropriate change of pick-up means and transfer table.

Other aspects of the illustrated embodiment are described and claimed in co-pending patent applications U.S. Ser. No. 165,160 and U.S. Ser. No. 165,162.

Having thus described the invention, what is claimed is:

1. An automatic bale wagon comprising a frame, a plurality of load floors mounted on the frame, bale pick-up means operable to pick up bales from the ground for delivery to one of the load floors, conveyor means including a first conveyor portion operable to convey bales on each load floor in a predetermined manner along a path of travel and a second conveyor portion operable to change the direction of movement of the bales at least at one point in the path of travel, bale support means movable in synchronism with the second conveyor portion to support the bales and to maintain said bales in engagement with said second conveyor portion at the point at which a change in the direction of movement of the bales is effected, and drive means for operatively powering said conveyor means.

2. An automatic bale wagon comprising a frame, a plurality of load floors disposed one above another and mounted on the frame, bale pick-up means operable to pick up bales from the ground for delivery to the lowermost load floor, conveyor means including a first conveyor portion operable to convey bales successfully on each load floor in a predetermined manner, and a second conveyor portion operable to transfer bales from one load floor to the next higher load floor, bale support means movable in synchronism with the second conveyor portion to support the bales and to maintain said bales in engagement with said second conveyor portion as said bales are being transferred by the second conveyor portion from one load floor to the next load floor above, and drive means for operatively powering said conveyor means.

3. A bale wagon according to claim 1 or 2, wherein the bale support means comprise two laterally spaced pivotal arms and an angled member interconnecting said pivotal arms, the angled member being engageable by a corner of the bales to be supported.

4. A bale wagon according to claim 3, comprising a shaft to which the arms of the bale support means are rigidly connected, a driven member of the second conveyor portion freely rotatably mounted on said shaft, and clutch means between said driven member and the shaft, the clutch means being engageable over a portion of each revolution of the driven member so as to drive the bale support means over a predetermined arc once per revolution of the driven member.

5. A bale wagon according to claim 4, wherein the driven member is a sprocket and the clutch means comprises an extension carried by the sprocket, a trip member mounted on the frame, and a member pivotally mounted on the shaft and having a hooked end and an angled heel portion at the other end, the extension being engageable with the hooked end of the member at a predetermined point in the rotational cycle of the sprocket so as to clutch the sprocket to the shaft, and hence drive the latter and the bale support means, the extension being disengageable from the hooked end of the member at a further predetermined point in the rotational cycle of the sprocket by the engagement of the heel portion of the member with the trip member so as to pivot the member out of engagement with the extension, whereby drive to the bale support means is interrupted and the bale support means return to the rest position.

6. A bale wagon according to claim 5, wherein said pivotal clutch member is arcuate and the sprocket extension comprises a roller and wherein the clutch means comprise spring means for resiliently urging the clutch member towards the shaft.

7. A bale wagon according to claim 3 wherein the conveyor means is formed by a single endless conveyor chain encompassing both the first and second conveyor portions.

8. A bale wagon according to claim 7 wherein the angled member of the bale support means has two limbs inclined at an obtuse angle relative to each other, one of said limbs being disposed below the surface of the respective load floor when said bale support means is in position to engage a bale for transfer thereof to the next load floor above.

9. A bale according to claim 8 wherein both said first and second conveyor portions further include a plurality of bale pushers connected equidistantly to said endless conveyor chain, each bale pusher being engageable with at least one bale to effect movement thereof along said path of travel.

10. A bale wagon according to claim 9 wherein one endless flexible conveyor chain is provided for the movement of bales along two adjacent load floors, the bale pushers depending downwardly from said conveyor chain to move bales along the path of movement on the lower load floor and projecting upwardly to move bales along the path of movement on the upper load floor.

11. A bale wagon according to claim 10 wherein each bale pusher is connected to the conveyor chain by a bracket having an extension disposed generally parallel to, and engageable with said conveyor chain to limit movement of the pusher caused by any flexing of said chain, each pusher being connected to said chain such that it is inclined to the vertical in the direction of the path of movement.

12. A bale wagon according to claim 11 wherein each bale pusher is C-shaped and is engageable with two bales for simultaneous movement thereof along said path of travel.

13. The bale wagon according to claim 2 wherein the first conveyor portion is operable to convey bales successively on each load floor in a predetermined manner so that the bale movement associated with one load floor is opposite to that associated with the adjacent lower load floor.

14. A bale wagon according to claim 13 wherein the drive means intermittently drives said first and second conveyor portions by a predetermined amount according to the size of bale being handled.

15. A bale wagon according to claim 14 wherein said guide means includes a linearly movable prime mover, a drive member pivotally attached to said prime mover and having a drive portion releasably engageable with the chain and normally being disengaged therefrom, and a drive-engaging member pivotally attached to the drive member, said drive-engaging member being engageable on one side of the pivot with said drive member and on the other side of the pivot with the chain through one of a plurality of equally spaced members mounted on the chain, movement of the prime mover moving both the drive member and the drive engaging member in the desired direction of movement of the chain so that the drive engaging member contacts the next spaced member and is pivoted to cause pivotal movement of the drive member such that the drive portion thereof engages the chain and imparts drive thereto.

16. A bale wagon according to claim 15 wherein the prime mover is a hydraulic cylinder which is retracted after each drive stroke.

17. A bale wagon according to claim 16 wherein movement of the prime mover is dependent upon the presence of bales at the infeed end of the lowermost load floor during loading of the bale wagon.

* * * * *